(12) United States Patent
Clausen et al.

(10) Patent No.: US 10,657,716 B2
(45) Date of Patent: May 19, 2020

(54) COLLABORATIVE AUGMENTED REALITY SYSTEM

(71) Applicant: California Institute of Technology, Pasadena, CA (US)

(72) Inventors: Matthew C. Clausen, Los Angeles, CA (US); Charles Goddard, Los Angeles, CA (US); Garrett K. Johnson, Pasadena, CA (US); Marsette A. Vona, III, Los Angeles, CA (US); Victor X. Luo, Pasadena, CA (US); Jeffrey S. Norris, Saratoga, CA (US); Anthony J. Valderrama, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 93 days.

(21) Appl. No.: 15/914,692

(22) Filed: Mar. 7, 2018

(65) Prior Publication Data

US 2019/0279424 A1    Sep. 12, 2019

(51) Int. Cl.
*G06F 3/01* (2006.01)
*G06T 19/00* (2011.01)
*G06T 19/20* (2011.01)
*G06F 3/0482* (2013.01)

(52) U.S. Cl.
CPC ............ *G06T 19/003* (2013.01); *G06F 3/017* (2013.01); *G06T 19/006* (2013.01); *G06T 19/20* (2013.01); *G06F 3/0482* (2013.01); *G06T 2210/21* (2013.01); *G06T 2219/004* (2013.01); *G06T 2219/024* (2013.01); *G06T 2219/2016* (2013.01)

(58) Field of Classification Search
CPC .................................................... G02B 27/017
See application file for complete search history.

(56) References Cited

U.S. PATENT DOCUMENTS

2017/0076503 A1* 3/2017 Tamaoki ............... G06T 19/006
2017/0308626 A1* 10/2017 Loberg ................ G06F 17/5004

OTHER PUBLICATIONS

"Parker Abercrombie and Alexander Menzies: Augmented Exploration", https://www.smithsonianmag.com/videos/category/innovation/parker-abercrombie-and-alexander-menzies-au/, Date printed: Nov. 8, 2019.
"Microsoft HoloLens: Gaze Input", https://www.youtube.com/watch?v=zCPiZIWdVws&feature=youtu.be&t=41s, Feb. 29, 2016.

(Continued)

*Primary Examiner* — Joseph R Haley
(74) *Attorney, Agent, or Firm* — Gates & Cooper LLP

(57) ABSTRACT

A method, apparatus, and system provide the ability to control navigation of a three-dimensional (3D) computer aided design (CAD) model in an augmented reality space. The 3D CAD model is rendered in the augmented reality space and appears as if it is present in a physical space at true scale. A virtual camera is defined as fixed to a current pose of a user's head. A virtual line segment S is constructed coincident with a ray R from a center of projection P of the virtual camera and a center pixel of the virtual camera. A check for geometric intersections between the virtual line segment S and surfaces of scene elements is conducted. Upon intersecting with a part of the model, a gaze cursor is rendered at an intersection point C closest to the center of projection P.

22 Claims, 14 Drawing Sheets

(56) References Cited

OTHER PUBLICATIONS

"Microsoft HoloLens: Skype", https://www.youtube.com/watch?v=4QiGYtd3qNI&feature=youtu.be&t=1m26s, Feb. 29, 2016.
"Microsoft HoloLens: Skype", https://www.youtube.com/watch?v=4QiGYtd3qNI&feature=youtu.be&t=31s, Feb. 29, 2016.
"Software Package Data Exchange (SPDX)", https://spdx.org, Copyright 2019.
"Get more | Autodesk Brand", brand.autodesk.com/resources/get-more#digital-asset-management, Copyright 2017.
"Node.js", https://nodejs.org/en/, Date printed: Nov. 8, 2019.
"Coordinate systems", https://docs.microsoft.com/en-us/windows/mixed-reality/coordinate-systems, Feb. 23, 2019.
"Polymer Project", https://lit-html.polymer-project.org/, Copyright 2018.
"Roboto—Google Fonts", https://fonts.google.com/specimen/Roboto, Date printed: Sep. 18, 2019.
"Underscore.js", https://underscorejs.org, Date printed: Sep. 18, 2019.
"Dropzone.js", https://www.dropzonejs.com, Copyright 2012.
"jQuery Cookie", https://plugins.jquery.com/cookie/, Copyright 2019.
"jQuery", https://jquery.com, Copyright 2019.
"GitHub—bestiejs/platform.js: A platform detection library", https://github.com/bestiejs/platform.js, Copyright 2019.
"kriskowal/q", documentup.com/kriskowal/q, Copyright 2009-2017.
"GitHub—McSimp/lzfjs: Compress and decompress data using LZF with no native dependencies", https://github.com/McSimp/lzfjs, Copyright 2019.
"three.js—JavaScript 3D library", https://threejs.org, Date printed: Sep. 18, 2019.
"Boost C++ Libraries", https://www.boost.org, Copyright 2004-2007.
"The VCG Library", vcg.isti.cnr.it/vcglib/, Date printed: Sep. 18, 2019.
"GitHub—open-source-parsers/jsoncpp: A C++ library for interacting with JSON", https://github.com/open-source-parsers/jsoncpp, Copyright 2019.
"Eigen", eigen.tuxfamily.org/index.php?title=Main_Page, last modified on Aug. 26, 2019.
"GitHub—gabyx/ApproxMVBB: Fast algorithms to compute an approximation of the minimal volume oriented bounding box of a point cloud in 3D", https://github.com/gabyx/ApproxMVBB, Copyright 2019.
"Adaptable file format for 3D animation software", https://www.autodesk.com/products/fbx/overview, Date printed: Sep. 18, 2019.
"Marc Lehmann's LibLZF", oldhome.schmorp.de/marc/liblzf.html, Last change: Aug. 25, 2008.
"JT", https://www.plm.automation.siemens.com/global/en/products/plm-components/jt.html, Copyright 2019.

* cited by examiner

COLLABORATIVE AUGMENTED REALITY SYSTEM

STATEMENT REGARDING FEDERALLY SPONSORED RESEARCH AND DEVELOPMENT

The invention described herein was made in the performance of work under NASA Contract Number NNN12AA01C and is subject to the provisions of Public Law 96-517 (35 USC 202) in which the Contractor has elected to retain title.

BACKGROUND OF THE INVENTION

1. Field of the Invention

The present invention relates generally to augmented reality systems within a computer-aided design (CAD) system, and in particular, to a method, apparatus, system, and article of manufacture for providing a collaborative visualization system for mechanical CAD models.

2. Description of the Related Art

Traditional CAD systems provide computers that aid in the creation, modification, analysis, or optimization of a design. In a CAD system, two-dimensional (2D) and/or three-dimensional (3D) models are rendered on a physical display device (e.g., one or more computer monitors, tablet devices, mobile devices, etc.). Once rendered, users typically edit and manipulate the model via a cursor control device such as a computer mouse or stylus. Such prior art CAD systems are limited in that the models are normally rendered on a static physical display device and a steep learning curve exists for users to rotate, scale, view, and manipulate the models. Further, with respect to models representing a large physical mechanical structure such as an automobile, boat, space exploration vehicle, etc., the small static physical display devices fail to provide the ability for a user to accurately visualize the model and the model's relative size in physical space.

Augmented reality (AR) superimposes a computer-generated image onto a user's view of the real world (thus providing a composite view). Virtual reality (VR) digitally simulates a product or environment where the user is able to interact and immerse themselves within it. Unfortunately, prior art CAD systems have failed to successfully provide an AR or VR based CAD system that enables users to collaborate and work together with models at true scale.

SUMMARY OF THE INVENTION

Embodiments of the invention provide a system that can load and render complex CAD models in a collaborative augmented reality environment. These models can include detailed models of spacecraft, vehicles, or any similarly complex mechanical system.

Embodiments provide features to support collaboration in augmented reality. In this regard, each user in a collaboration session has their own toolbox, but when the translate, rotate, and scale tools are used the results are shared in real time with all other users in the session. This allows all participants in the session to collaboratively move the model and components thereof with the perception of a shared physical space.

Embodiments further enable hand-gesture based interactions and user interfaces to interact with and reposition CAD models in augmented reality, which are designed to be intuitive and rapid, but also allow quantitative movements and fine adjustments. These include free/constrained and fine/gross manipulation modes.

Embodiments further provide visual and interaction design elements that minimize distraction. These include the continuity of motion, obstruction avoidance, iconography, and specialized menu minimization and transformation features.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
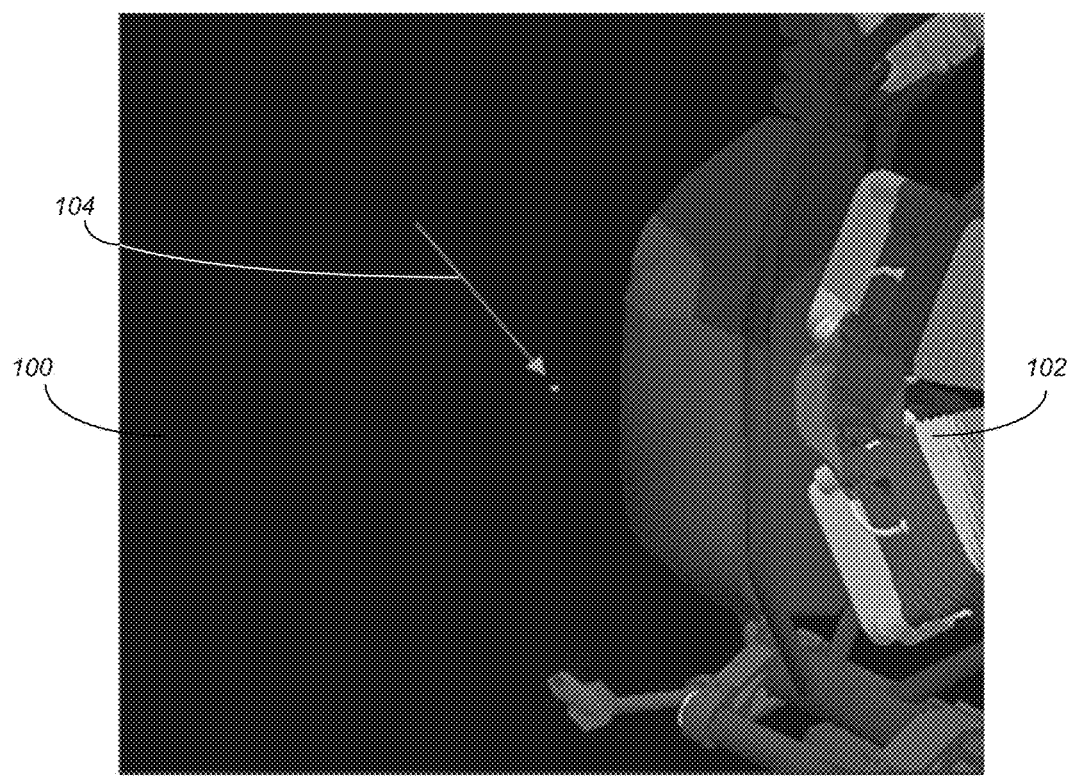
FIG. 1A illustrates a use of rendered display of a model in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Overview

Embodiments of the invention provide a collaborative visualization system (also referred to herein as Proto-Space™, the Protospace™ AR system, or the Protospace™ application) for mechanical CAD models in augmented reality. One or more embodiments operate as an application within a head mounted display or other type of wearable computer (e.g., MICROSOFT HOLOLENS™). Embodiments may also include a set of network servers that facilitate communication and data storage as well as a web-based interface. In a typical usage session, one or more users wearing a head mounted display launch the application and load a CAD model. The CAD model is rendered using AR/VR technology so that it appears as if it were present in the room. The model appears at approximately the same position and orientation in the room for all users, who may walk around it, point to parts of it, and have discussions about the model as if the model were physically there. Often between two and ten users participate in such a session, but a session may be comprised of as few as one person or as many as 20 people, given sufficient space. It is also possible to have multiple simultaneous sessions in different physical spaces using one installation of embodiments of the invention. Such sessions may either be isolated from each other or may be connected into one or more shared sessions with non-collocated users. During a collaboration session, as the user moves around physical space, the model apparent position does not move in the space—instead, the model's apparent position stays consistent, allowing the user(s) to potentially think of the model as present in the "real" world.

Various interactive tools are provided to interact with the model including moving it, moving parts of it, changing its scale, and cutting through it with a virtual section plane. An alignment tool offers several ways to align the virtual model with physical hardware, including a semi-automated technique based on automatically detecting fiducial markers using computer vision. The ProtoSpace™ AR System can handle relatively complex models with up to 2 million triangles and 100 thousand subassemblies. It loads CAD models which have been prepared and optimized by the processing pipeline, which offers various tools to conveniently remove details (for example, hidden internal components) so that much larger models can also be visualized.

Further to the above, one may note that the Protospace™ AR system provides the ability to load and render complex CAD models in a collaborative augmented reality environment. These models can include detailed models of spacecraft, vehicles, or any similarly complex mechanical system. As described herein, embodiments of the invention provide support for collaboration, hand-gesture based interactions and user interfaces to interact with and reposition CAD models in augmented reality (that are designed to be intuitive, rapid, but allow quantitative movements and fine adjustments), tools for aligning virtual models to physical objects, and integration with a processing pipeline and web portal.

In addition, embodiments of the invention support transparent geometry and animations. In this regard, embodiments may provide a facility for defining groups of subassemblies or parts of the model that can be hidden or shown together. Further, a web-based control panel may enable the ability to control most functions of the system during a collaboration session. Such a control panel may provide a scripting interface that supports writing, editing, and playing back scripts in an application specific language. Such scripts may also control most functions of the system and can be used to establish a sequence of states of one or more models, for example, to define, rehearse, and deliver a repeatable presentation in the Protospace™ system.

As described herein, embodiments of the invention broadly address the challenges of facilitating collaboration, discussion, communication, and presentation among people about CAD models of physical systems which may not have been built yet, or which are otherwise not conveniently available to view physically. In particular, embodiments of the invention address the following challenges:

- loading and rendering complex CAD models within the computational resources available on an un-tethered wearable display;
- allowing multiple simultaneous users to see, point to, and interact with a virtual CAD model showing the CAD model at approximately the same place in the room for all users;
- aligning augmented reality renderings of a CAD model with physical hardware
- providing an intuitive interface in the medium of augmented reality for interacting with CAD models using hand gestures; and
- supporting non-collocated sessions where not all users may be in the same physical space.

CAD models are prepared for visualization in the ProtoSpace™ AR System by the processing pipeline (described in detail below). The processing pipeline may optionally also be used with a web portal (also described below). The ProtoSpace™ AR System can load and display CAD models with up to approximately 2 million triangles and 100 thousand subassemblies. Larger models can be accommodated by first processing them with the processing pipeline to reduce their complexity, typically by selecting a subset of the model.

In view of the above, it may be noted that embodiments of the invention enable mechanical engineers and designers to visualize and manipulate 3D CAD models in physical space at true scale. This enables users to easily share designs, discover problems, design integration approaches, and evaluate safety before physical hardware is created. The uniqueness of these use cases requires a novel approach to interface design.

However, users of AR/VR CAD systems have certain interface expectations, specifically with regard to menu interfaces as well as 3D manipulation tools such as rotation, translation, and scale. These come in part from prior experiences users have had with traditional CAD tools. Many traditional CAD graphical user interfaces (GUIs) are comprised of rectangular panels containing modal button tool sets framing a 3D workspace projected onto a 2D screen. This design makes the tools accessible while minimizing occlusion of the 3D model. However, in embodiments of the invention, the models are visualized in physical space using AR/VR rendering and the user is constantly moving, so if the tool interface is locked to a particular location the user will have difficulty accessing it at all times, and it may occlude view of the model at other times.

An additional constraint for a virtual CAD application is the limitation of the field of view of the augmented reality rendering hardware. Current devices such as the MICROSOFT HOLOLENS™ may be limited to approximately 30 degrees horizontal by 17.5 degrees vertical resulting in a perceived display size that is only a fraction of the user's vision. This limitation makes it extremely important to use display real estate efficiently.

Embodiments of the invention provide a toolbox user interface (also referred to as a toolbox or graphical toolbox) (for each user) that is designed to be there when it is needed, and get out of the way when it is not. By default, the toolbox is hidden; it may be summoned by a hand gesture that is detected by a head-mounted display. The toolbox provides a menu of tools the user may employ to interact with the model and with the system, including tools to pick, highlight, hide, and show individual subassemblies or parts of the model. Further tools provide the ability to rotate, translate, and scale the model or individual subassemblies or parts thereof. Any participant in session may use these tools at any time to adjust the pose of the model relative to the physical environment, and all other participants also see the resulting changes in model pose. In this regard, a tool may change the displayed scale of the model—users may choose to view models at full scale (where one meter in the model corresponds to one meter in the physical world), or the user may choose to show the models at reduced or increased scales. A section plane tool may be placed and moved interactively to cross-section the model.

Further, an alignment tool may be used to finely adjust the position, orientation, or scale of the model in the world. The alignment tool may also contain a sub-tool which, when triggered, uses a camera on the head-mounted computer to detect special visual fiducial markers placed in the environment. This enables the virtual model to be aligned to a physical location in the environment, including overlaying it on corresponding physical hardware. The visual alignment tool may also provide basis for establishing a shared coordinate frame for multiple users in the same physical space.

A system tool may further provide access to functionality not specific to the current model, including a selection menu that displays the available set of models and allows users to switch to view a different model.

In view of the above, toolboxes in accordance with embodiments of the invention may include a number of features including one or more of the following:

Gaze Cursor, Air Tap, and Point of Interest
Menu Minimization and Submenu Transformation
Iconography
Follow and Catch Behaviors
Continuity of Motion
Obstruction Avoidance and Distance Maintenance
Free vs Constrained Manipulation
Fine vs Gross Manipulation Each these features are described in further detail below.

Gaze Cursor, Air Tap, and Point of Interest

Figure 1B:
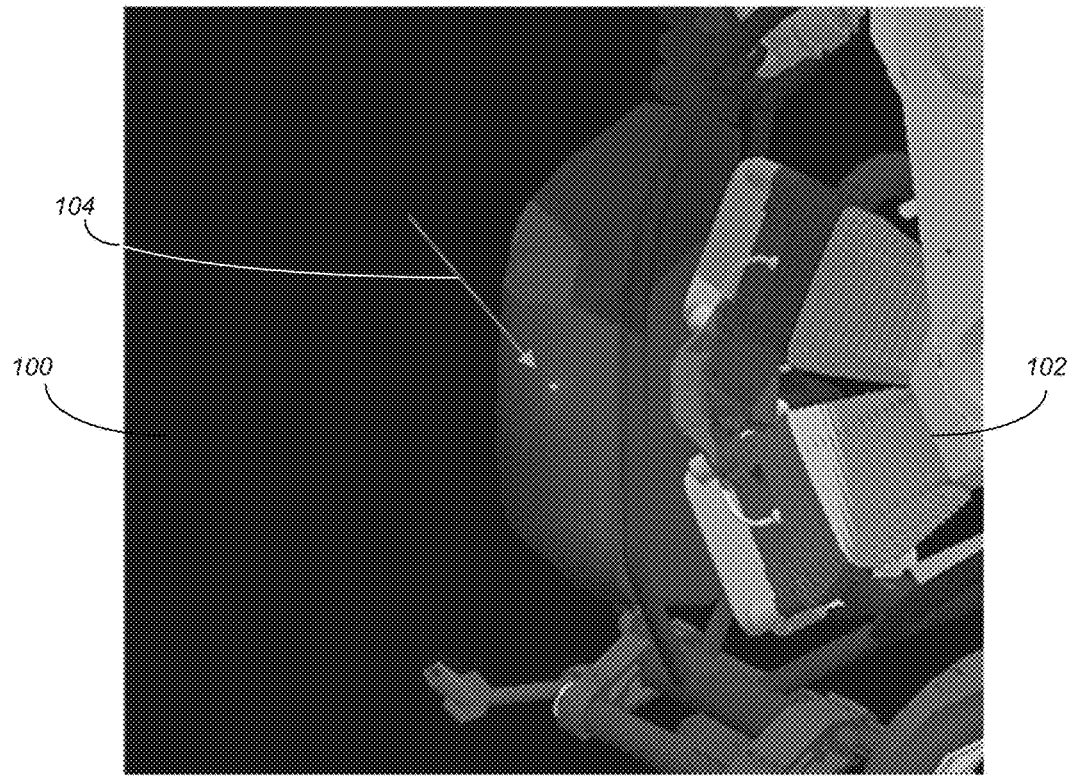
FIG. 1B illustrates a gaze cursor that has snapped to the surface of the model and is displayed in a visually distinguishable manner with a glow highlight in accordance with one or more embodiments of the invention.

As the user looks around in the ProtoSpace application, a small sphere called the gaze cursor is visible in the center of the field of view. As the user gazes onto rendered elements, including user interface objects or the CAD model geometry, the gaze cursor snaps onto them. FIG. 1A illustrates a use of rendered display 100 of a model 102. As illustrated, the gaze cursor 104, indicated by the arrow, does not fall on any object and is rendered in a neutral color (e.g., grey). The gaze cursor 104 moves to follow the direction of the user's head. The CAD model 102 remains stationary in space. As the gaze cursor 104 moves onto the model 102, the gaze cursor 102 snaps to the surface of the model 102. The gaze cursor may also turn a different color that is visually distinguishable (e.g., green) and a small glow highlight may be rendered around the cursor 104 on the model 102. FIG. 1B illustrates a gaze cursor 104 that has snapped to the surface of the model 102 and is displayed in a visually distinguishable manner with a glow highlight.

In various head mounted displays (e.g., HOLOLENS™), the primary input mechanic established for the platform may consist of an air tap. As used herein, the gaze cursor 104 may be analogous to the mouse on a traditional platform, and the air tap is analogous to clicking the mouse button. In one or more embodiments, the air tap may be activated when the user extends their hand with a raised index finger and taps their finger, quickly lowering it. When this gesture is performed in the ProtoSpace application, interactive elements can be activated at the location of the gaze cursor 104 if they are available. By default, when the user gazes at the CAD model 102 and air taps, a point of interest (PoI) marker may be placed at that location.

Figure 1C:
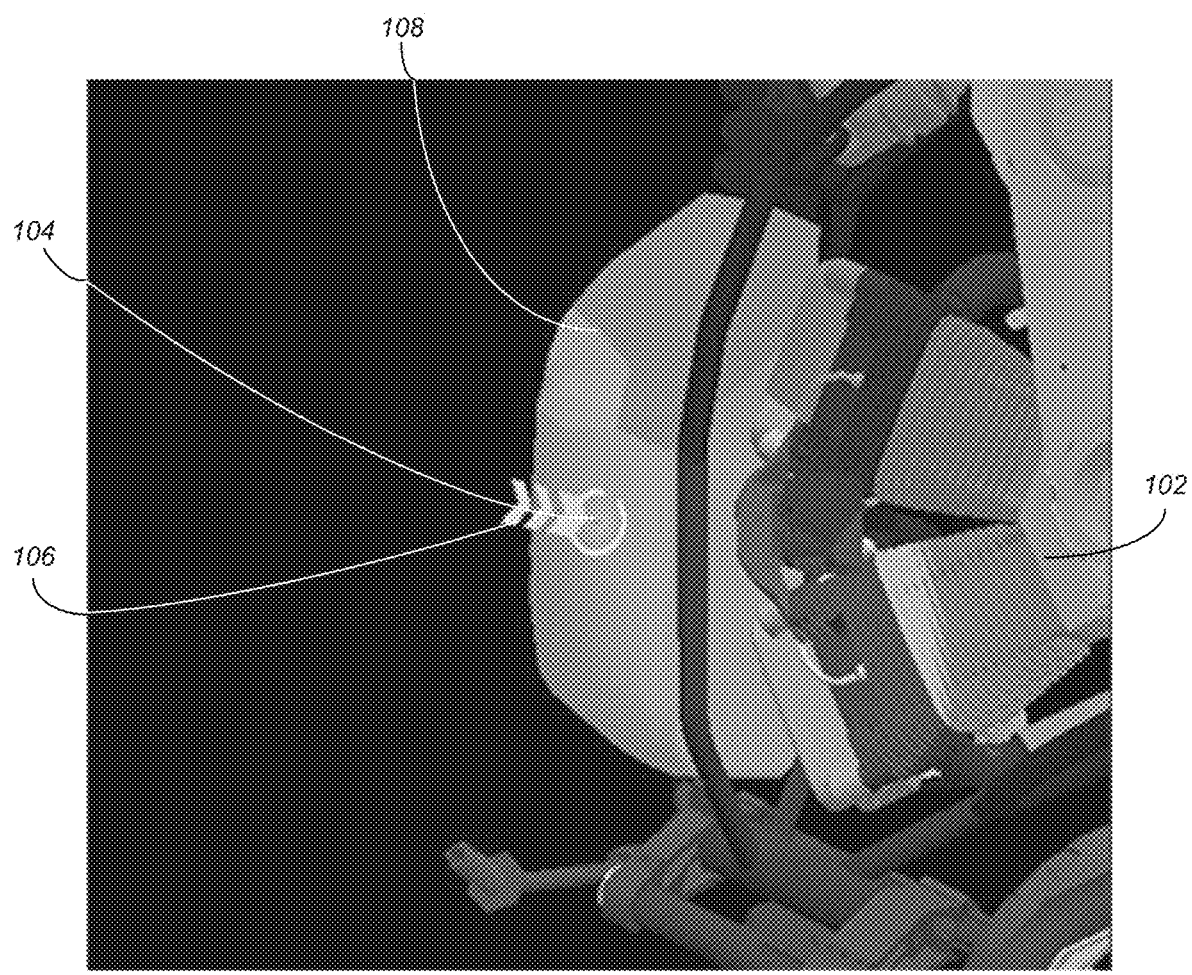
FIG. 1C illustrates a point of interest marker that is displayed based on an air tap in accordance with one or more embodiments of the invention.

FIG. 1C illustrates a point of interest marker 106 that is displayed based on an air tap in accordance with one or more embodiments of the invention. When the user air taps with the gaze cursor 104 on the CAD model 102, a point of interest (PoI) marker 106 is placed at that location. The corresponding CAD part 108 may also be displayed in a visually distinguishable manner (e.g., highlighted in blue). In one or more embodiments of the invention, the PoI marker 106 consists of a white circle centered on the gaze cursor 104 and three arrow chevrons that point at it. The marker may be three dimensional and oriented perpendicular to the surface of the CAD model 102. In this regard, when no specific tool is selected from the main menu/toolbox, a particular component may be selected by highlighting such a component, playing a chime to other collaborating participants, and placing three chevrons calling attention to the component. Once selected, the selected part may be manipulated as described below.

Figure 2:
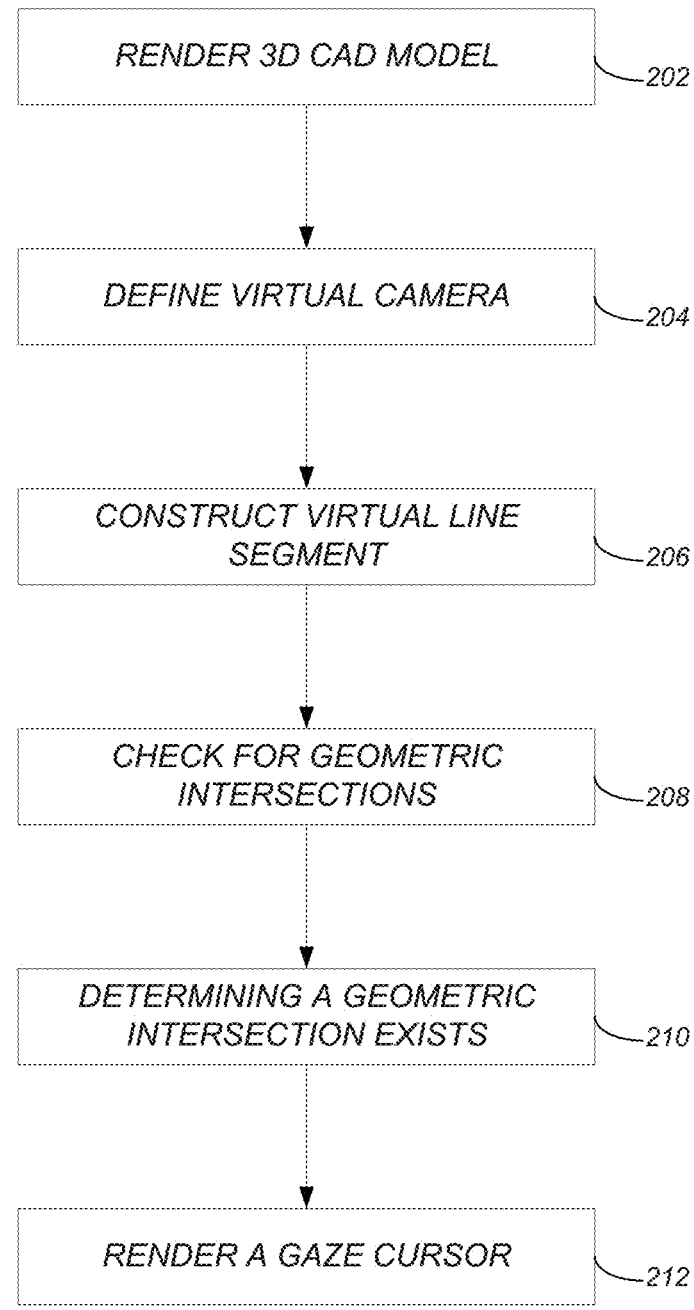
FIG. 2 illustrates the logical flow for controlling navigation of a three-dimensional (3D) computer aided design (CAD) model in an augmented reality space via a gaze cursor and point of interest in accordance with one or more embodiments of the invention.

FIG. 2 illustrates the logical flow for controlling navigation of a three-dimensional (3D) computer aided design (CAD) model in an augmented reality space via a gaze cursor and point of interest in accordance with one or more embodiments of the invention.

At step 202 the 3D CAD model is rendered in an augmented reality space. Such a rendering provides that the 3D CAD model to appear as if the 3D CAD model is present in a physical space at true scale.

For reach rendered frame steps 204-212 are performed.

At step 204, a virtual camera A is defined as being fixed to a current pose of a user's head. Such a camera may face forward (i.e., from the user's perspective) and represents a field of view that is rendered to a user's display.

At step 206, a virtual line segment S is constructed coincident with a ray R from a center of projection P of the virtual camera and a center pixel of the virtual camera A. The virtual line segment S may start at a pre-defined minimum distance ($D_{near}$) from the projection P and may end at a pre-defined maximum distance ($D_{far}$) from the projection P.

At step 208, a check is conducted for geometric intersections between the virtual line segment S and surfaces of scene elements. The scene elements include parts of the 3D CAD model and user interface objects.

At step 210, a determination is made that such a geometric intersection exists. Once a geometric intersection (e.g., at an intersection point C closest to the center of projection P) has been identified, embodiments of the invention may classify the type of object that the intersection point C lies on—i.e., it may be either a part of the CAD model or a user interface object.

At step 212, once a determination has been made that the intersection point is on a part of the CAD model, a gaze cursor at an intersection point C closest to the center of projection P is rendered. The gaze cursor consists of a visually distinguishable indicator (e.g., a colored sphere such as a green sphere). Further, the visually distinguishable indicator may consist of a point light that creates a local surface glow effect (e.g., an appearance of glowing within a defined radius of the colored sphere in a color similar to that of the colored sphere).

Further to the above, in one or more of the steps, a user may initiate an air tap gesture. If an air tap gesture is initiated when a user is gazing at a particular part K (e.g., for a particular frame F), then the part K may be highlighted (e.g., via display in a visually distinguishable color such as blue), an outward pointing surface normal N of part K at point C may be determined, a point of interest marker may be shown/rendered at point C oriented along N, and a "point of interest placed" network message may be transmitted to all other participants in the (collaboration) session. Such a "poi placed" network message may include a payload containing/identifying a CAD part K, the point C (i.e., an intersection point that is closest to the center of projection), and the surface normal N.

Once a "poi placed" network message has been received (by the other participants in the collaboration session), the identified part K may be highlighted (in that participant's display), and a point of interest marker may be rendered at the intersection point C along the surface normal N.

If a determination is made that the point C lies on a user interface object O, then a "gazed-at" message may be transmitted/sent to the user interface object O. Further, if an air-tap gesture is detected for frame F when gazing at object O, then an "air-tapped" message may be sent to the user interface object O.

In view of the above, a gaze cursor is displayed and follows the user's view as the user moves his/her head to look around. Such a gaze cursor may consist of a small circle in the middle of the display. In addition, if an air-tap gesture is initiated while gazing at a part of the model, the part is highlighted and collaborating users are notified (i.e., the display is synchronized with respect to the "tapped" part). However, if the user is gazing at a user interface object, such actions likely do not affect the other participants, and an air-tap gesture will not result in an action that causes other participants to receive a notification.

Further to the above, during step 208 or when rendering the gaze cursor at step 212, a check may be conducted for additional geometric intersections between the virtual line segment S and surfaces of scene elements. Upon a determination that no geometric intersections are found, the gaze cursor may be rendered on a ray R at a predefined distance $D_{miss}$ (i.e., a distance when the user has missed gazing at a scene element/user interface object) from the center of projection P. Such a gaze cursor may consist of a small grey sphere. If an air tap gesture is detected when gazing at no part/scene element or user interface object, all highlighting of parts may be removed, any displayed point of interest marker may be hidden, and a "poi-hidden" network message may be sent/transmitted to all other participants in the collaboration session.

Once a "poi hidden" message has been received by collaborating participants, the highlighting of the part may be removed and the point of interest marker may be hidden on the display of such participants.

Menu Minimization and Submenu Transformation

In embodiments of the invention, a user interface toolbox may be hidden by default to avoid obscuring the model when it is not in use. The user performs a double air tap to summon the toolbox. The ProtoSpace Toolbox main menu then appears by expanding in a smooth animation from a point at the location of the gaze cursor, first to a sphere, and then to a horizontal rounded solid. The rounded menu is designed to occupy the least visible display area. Circular main menu buttons are arranged within the menu. Embodiments of the invention may also minimize the number of main menu items to limit display usage.

When the gaze cursor is on a menu button, the button lights up and pops out toward the user slightly (e.g., a predefined distance), providing the user with feedback that it is an active object. If the user air taps on such a button the corresponding tool is activated. The toolbox menu then collapses in a brief smooth motion to a half-sphere surrounding the button of the selected tool. If the activated tool has a sub-menu, it then expands vertically, revealing sub-menu buttons below the selected main menu button icon. The main menu is thus horizontal while tool sub-menus are vertical, enabling a user to understand if they are in the main menu or a tool sub-menu without requiring any additional screen real estate.

In embodiments of the invention, the toolbox will auto-minimize after a period of non-use. This is done with a smooth animation that shrinks the toolbox to a half-sphere surrounding the button corresponding to the currently active tool. The toolbox may automatically re-maximize when the user interacts with the half-sphere again.

Figure 3B:
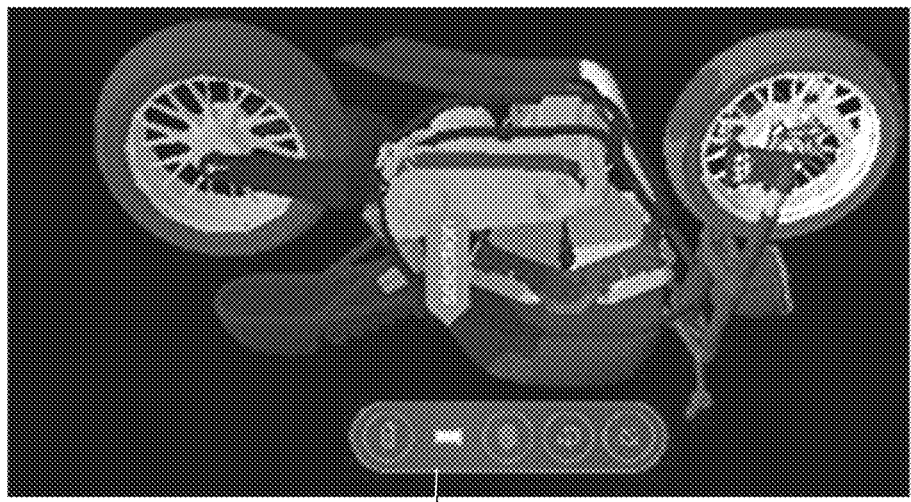
FIGS. 3A and 3B illustrates a horizontal toolbox and a vertical toolbox respectively displayed pursuant to user gestures in accordance with one or more embodiments of the invention.
Figure 3C:
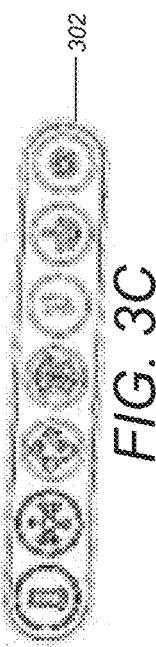
FIG. 3C illustrates a zoomed in view of the toolbar 302 in accordance with one or more embodiments of the invention.
Figure 3A:
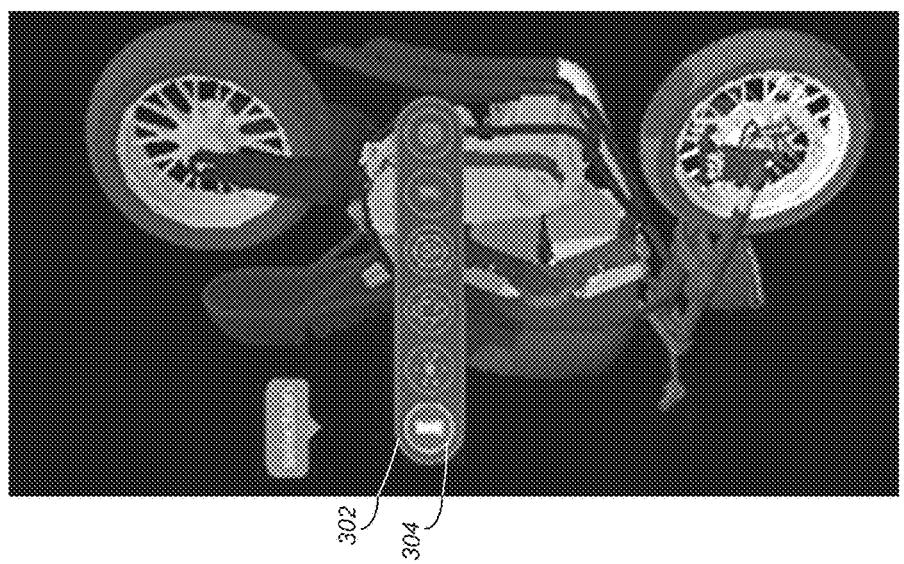

In embodiments of the invention, the toolbox may alter its display configuration based on user gestures. FIGS. 3A and 3B illustrates a horizontal toolbox and a vertical toolbox respectively displayed pursuant to user gestures in accordance with one or more embodiments of the invention. In FIG. 3A, when the user double air taps (e.g., in any open space), the horizontal toolbox main menu 302 appears in a smooth animation at the location of the gaze cursor. Once summoned, the tools in the toolbox 302 may be selected and utilized. In FIG. 3B, when the user air taps on a button (e.g., button 304) in the main menu, the toolbox 302 reconfigures in a smooth animation to a vertical sub-menu for the selected tool 304.

If the user double air taps again while the toolbox 302 is active, the toolbox 302 is dismissed and disappears with a smooth animation that is the reverse of its original appearance animation. The toolbox 302 can be re re-summoned by another double air tap. This interaction behavior and graphical design enable the user to access and use a set of tools while minimizing the amount of occupied display space. FIG. 3C illustrates a zoomed in view of the toolbar 302 in accordance with one or more embodiments of the invention.

Figure 4:
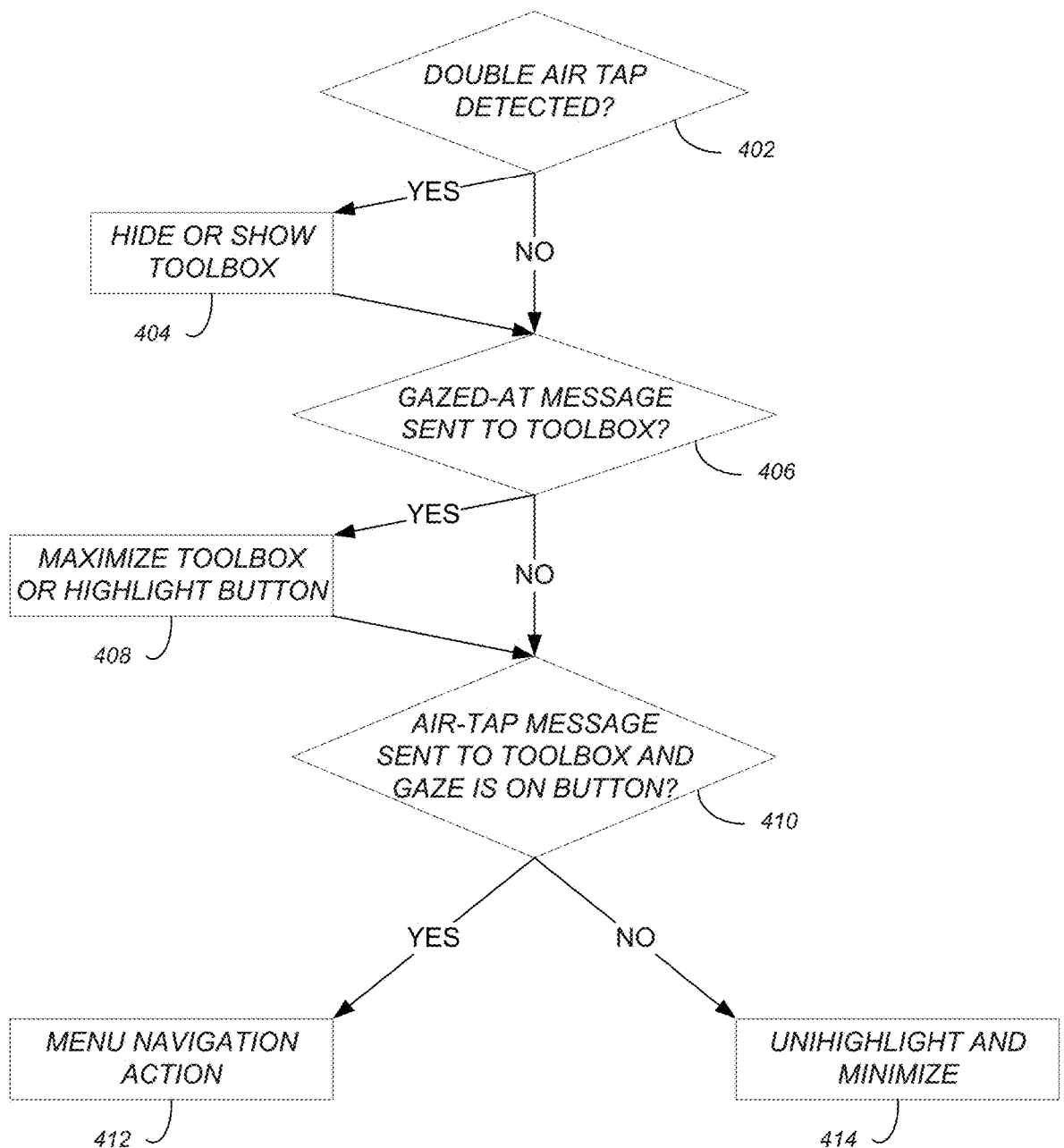
FIG. 4 illustrates the logical flow for activating a toolbox and sub-menus in accordance with one or more embodiments of the invention.

FIG. 4 illustrates the logical flow for activating a toolbox and sub-menus in accordance with one or more embodiments of the invention. The steps of FIG. 4 are performed for each rendered frame.

At step 402, a determination is made regarding whether a double air tap gesture was detected.

At step 404, when detected at step 402, if the toolbox is currently shown, then an animation sequence is triggered to hide the toolbox. If the toolbox is currently hidden, then an animation sequence is triggered to show the toolbox at the current location of the gaze cursor.

At step 406, a determined is conducted regarding whether a "gazed-at" message was sent to the toolbox.

At step 408, if the toolbox is currently minimized and at least a pre-defined minimum amount of time ($T_{maximize}$) has elapsed since the last frame where it did not receive a "gazed-at" message, then a smooth animation sequence is triggered to maximize the toolbox. Further, if the gaze cursor is on a toolbox button B, then all other buttons are un-highlighted and moved to their default positions. In addition, if the gaze cursor is on the button B, button B is highlighted and may be moved slightly outwards (i.e., outwards a defined distance to visually distinguish the button) from the toolbox. In other words, if the user moves the gaze cursor away from the menu/toolbox, the menu may be minimized.

At step 410, a determination is conducted regarding whether an "air-tapped" message was sent to the toolbox AND the gaze cursor is on a toolbox button B.

If the determination is positive at step 410, a series of menu navigation actions may be performed at step 412:

In particular, if B is a button in the toolbox main menu, then an animation sequence is triggered that closes the horizontal main menu while keeping the position of B fixed. Further, if the tool corresponding to button B has a vertical sub-menu, the animation sequence that opens the vertical sub-menu is triggered (such an animation also keeps the spatial position of B fixed).

Alternatively, if B is the topmost button in a vertical tool sub-menu, then the animation sequence that closes the sub-menu and re-opens the horizontal main menu is triggered.

Alternatively, if B is any other button in a vertical tool sub-menu then a "button-pressed" event is transmitted/sent to the corresponding tool with payload B.

If none of the conditions at step 402, 406, or 410 are true (i.e., no double-tap, air-tap, or gazed-at messages are sent to the toolbox), or if the toolbox is currently hidden, then the following actions may be performed:

All toolbox buttons are un-highlighted and moved to their default positions.

If the toolbox is currently not minimized AND at least a pre-defined minimum amount of time ($T_{minimize}$) has elapsed since the toolbox received the last "gazed-at" message, then the animation sequence to minimize the toolbox is triggered.

Iconography

All menu items are designed using icons that are representative of the indicated function. In addition, each menu item is designed to be recognizable without a text popup. Such a design also minimizes the amount of screen real estate occupied by interface elements.

Follow and Catch Behaviors

While activated, the toolbox will follow the user and attempt to maintain a position in the upper right corner of the display. This makes the toolbox always available but helps minimize obstruction of the CAD model. The toolbox delays a short while before the follow motion is triggered, and employs a two-dimensional band of spatial hysteresis to allow the user to move somewhat before triggering the follow motion. These techniques reduce movement noise, and also allow the user to interact with the toolbox by moving their gaze on it without triggering it to move. The follow behavior enables the user to be able to access the menu from anywhere in the mixed reality work space so they can move freely and activate a tool when and where they need it.

Figure 5:
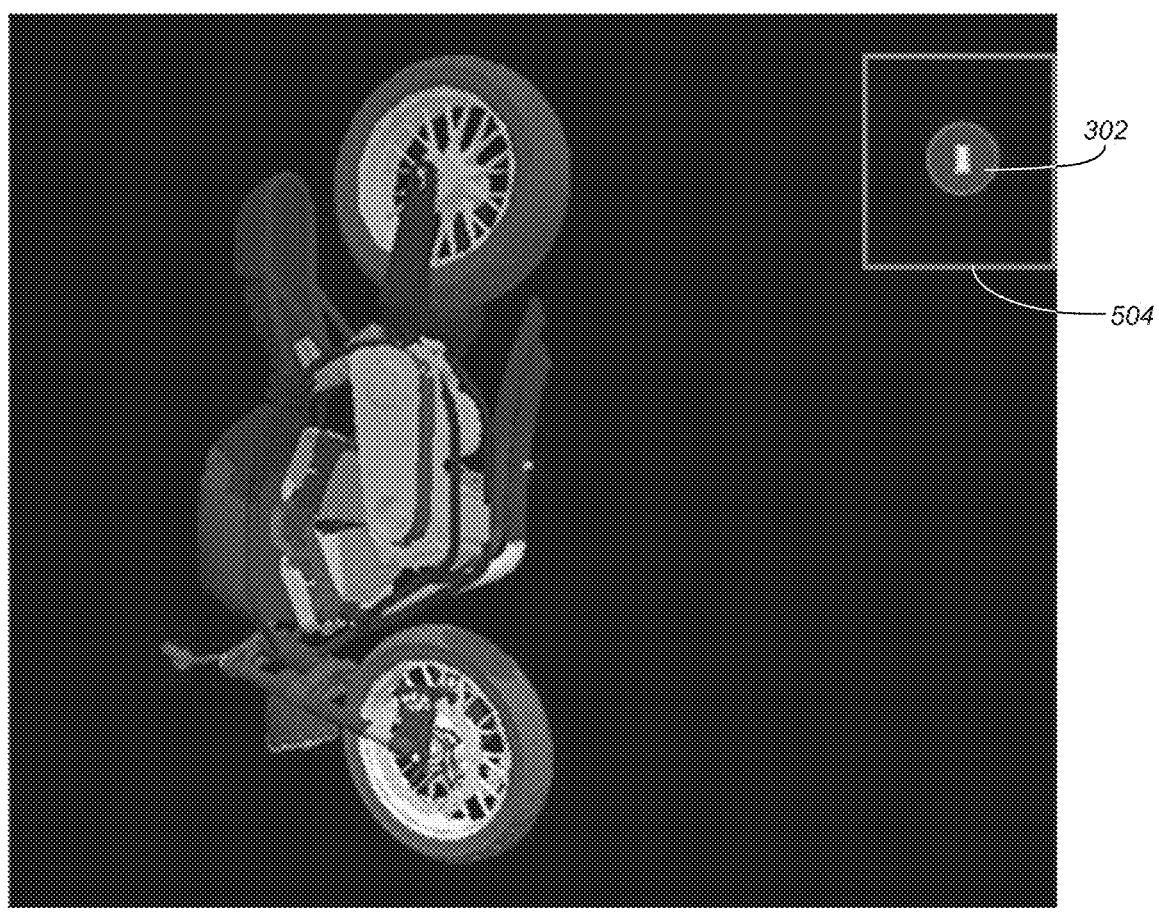
FIG. 5 illustrates a toolbox that automatically moves to the upper right corner of the user's field of view, following the user as he/she moves around in accordance with one or more embodiments of the invention.

FIG. 5 illustrates a toolbox 302 that automatically moves to the upper right corner of the user's field of view, following the user as he/she moves around in accordance with one or more embodiments of the invention. The box 504 (that may be displayed in a distinguishable color such as blue) indicates the invisible hysteresis zone. Note that box 504 is displayed for illustrative purposes in this patent application and may not be actually displayed (i.e., is invisible and not rendered) in an actual implementation.

Figure 6:
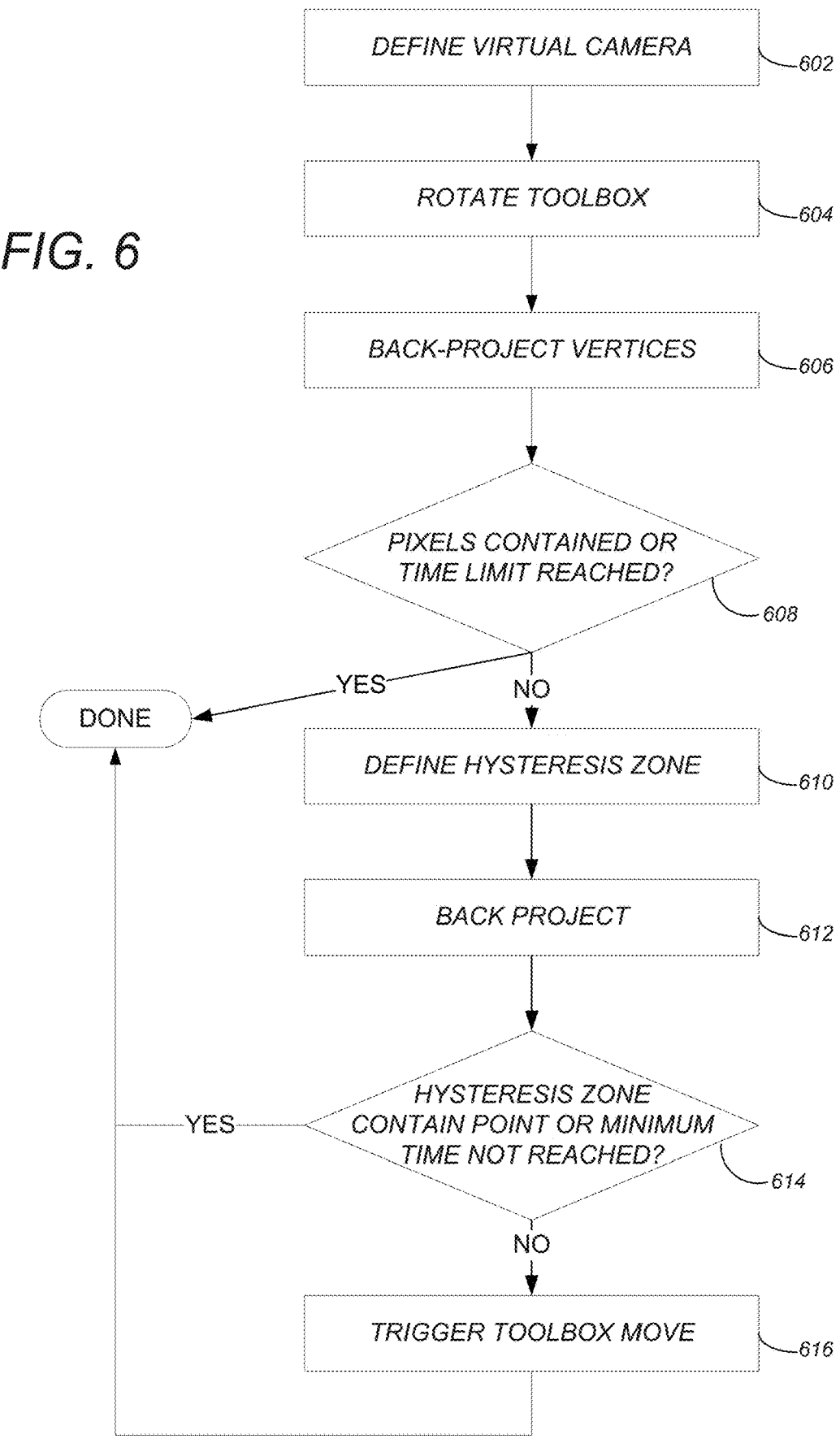
FIG. 6 illustrates the logical flow for the toolbox following the user's gaze in accordance with one or more embodiments of the invention.

FIG. 6 illustrates the logical flow for the toolbox following the user's gaze in accordance with one or more embodiments of the invention. The steps of FIG. 6 are performed for each rendered frame.

If the toolbox is not currently active, the steps of FIG. 6 are not performed. In other words, the toolbox following the user's field of view will only be conducted when the toolbox is active.

At step 602, a virtual camera A with a center of projection P fixed to the current pose of the user's head is defined. This camera faces forward and represents the field of view that is rendered to the user's display.

At step 604, the toolbox is rotated by a pre-defined relative angle to align the front face of a 3D bounding box X (of the toolbox) parallel to the pixel plane of the virtual camera A, and so that the front of the toolbox faces the user and is upright with respect to a gravity vector.

At step 606, the vertices T of the front face of the 3D bounding box X of the toolbox are back projected to pixels U of the virtual camera A.

At step 606, a determination is made regarding whether all of the pixels in U are contained within the visible bounds of the virtual camera A, OR whether a pre-defined minimum amount of time ($T_{follow}$) has not yet elapsed since the last frame in which that was the case. If both conditions are true, there is no need to move the toolbox and the process is complete.

If it is determined at step 606 that the pixels U are not contained in the visible bounds of the virtual camera A, OR the pre-defined minimum amount of time has elapsed, then at step 608, a rectangular hysteresis zone Z is defined at a pre-defined position in the upper-right of the pixel space of the virtual camera A.

At step 610, the center O of the 3D bounding box X is back projected to the pixel L of the virtual camera A that is intersected by the line containing points O and the center of projection P.

At step 614, a determination is made regarding if the hysteresis zone Z contains pixel L, OR if a pre-defined minimum amount of time ($T_{follow}$) has not yet elapsed since the last frame in which that was the case. If both conditions are true, then there is no need to move the toolbox (in this frame) and the process is complete.

If the conditions are not true, then at step 616, the start of an animation motion is triggered that moves the toolbox from its current location T to a new point V at a pre-defined distance $D_{toolbox}$ from P along the ray from P through the center of Z.

Figure 7:
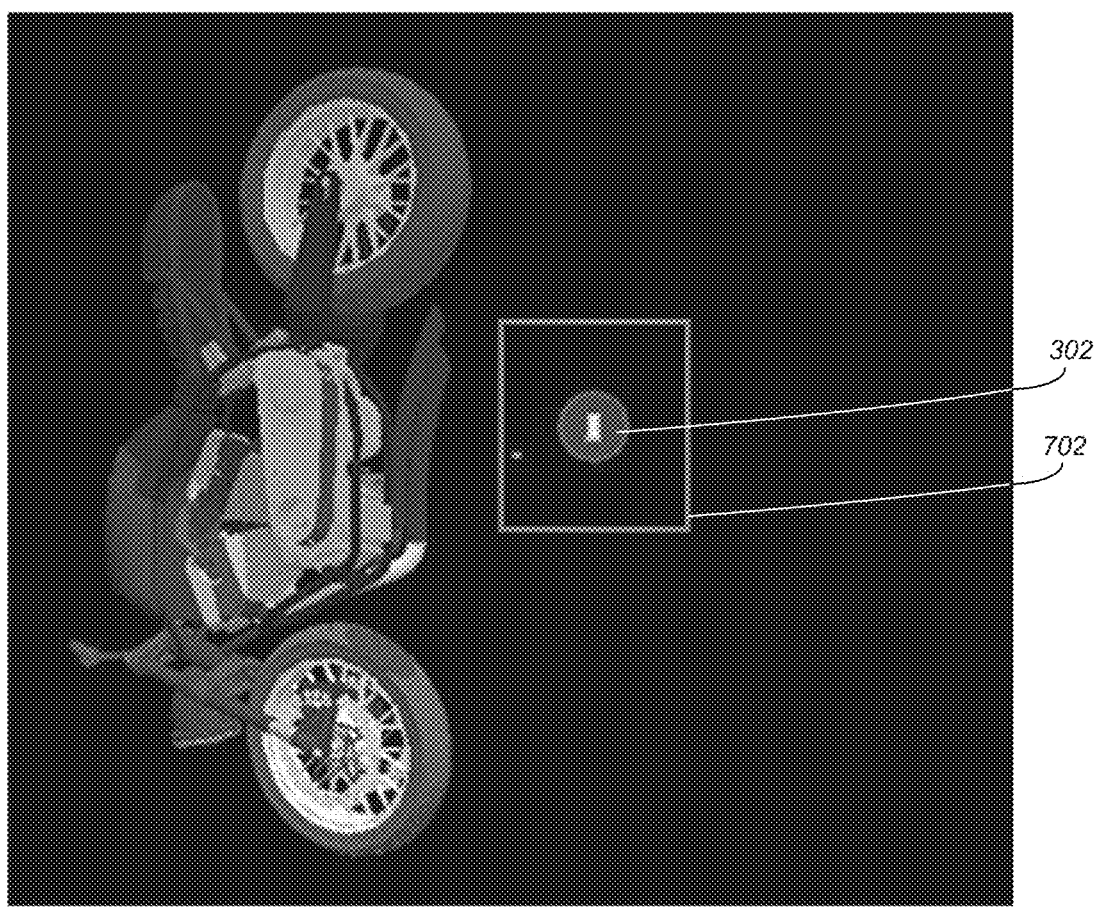
FIG. 7 illustrates a catch zone and a catch operation in accordance with one or more embodiments of the invention.

The steps of FIG. 6 define the sequence for conducting a follow operation. In addition to following a user's gaze, if the user gazes near the toolbox when it's moving, it will catch (stop moving) and the toolbox may expand if it was minimized. This behavior occurs when the gaze cursor enters an extended catch zone around the toolbox, which makes it easier to catch. Unlike the follow motion, the catch behavior is triggered instantly, so that user does not have to chase the toolbox. FIG. 7 illustrates a catch zone and a catch operation in accordance with one or more embodiments of the invention. If the user gazes near the toolbox 302 while it's moving, it immediately stops. The box 702 (e.g., that may be displayed in a visually distinguishable color such as blue) indicates the invisible "catch zone". Note that box 702 is illustrated for purposes of illustration but is invisible (not rendered to the user) in an actual implementation.

Figure 8:
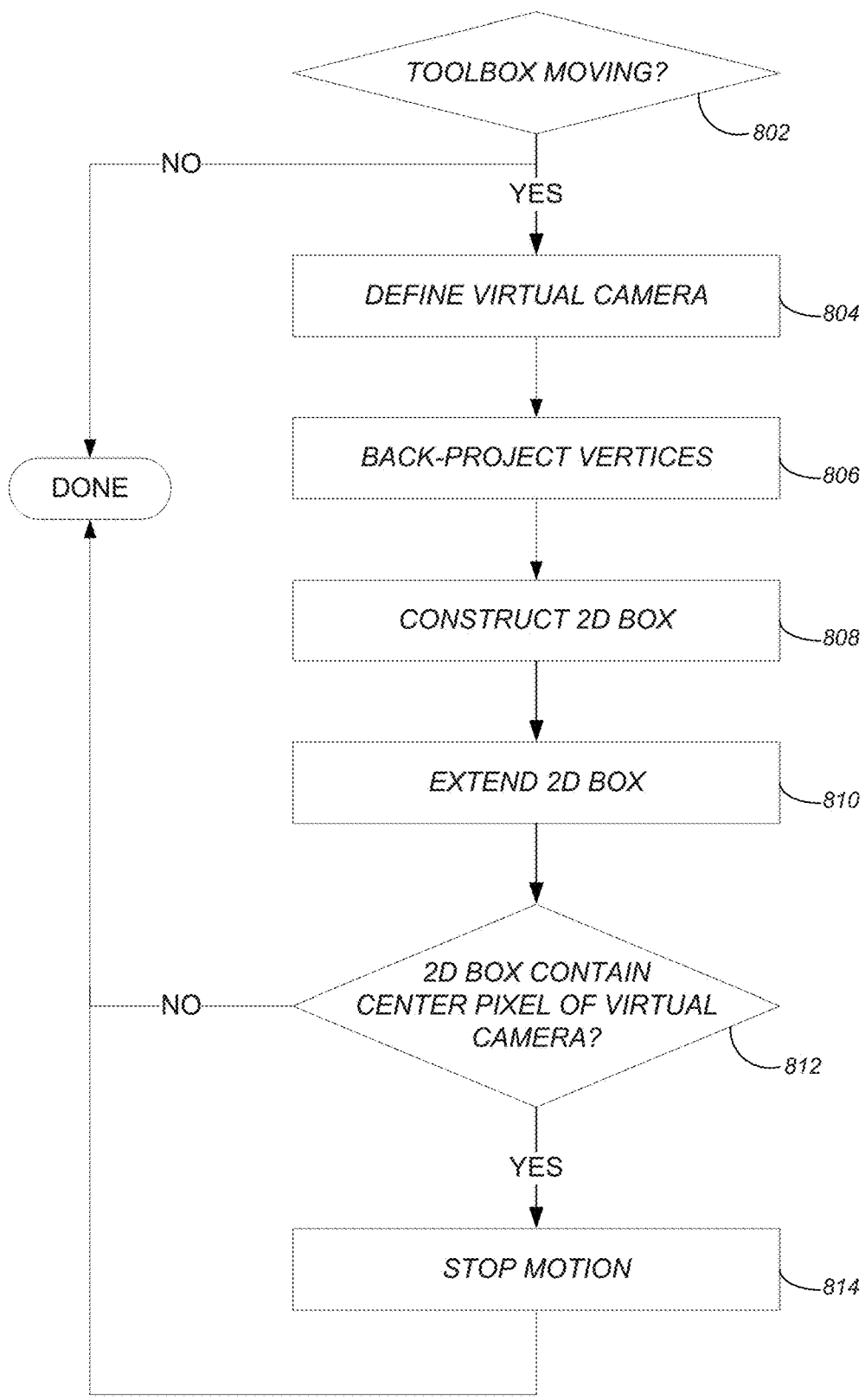
FIG. 8 illustrates the logical flow for performing a toolbox catch operation in accordance with one or more embodiments of the invention.

FIG. 8 illustrates the logical flow for performing a toolbox catch operation in accordance with one or more embodiments of the invention. The steps of FIG. 8 are performed for each rendered frame.

At step 802, a determination is made regarding whether the toolbox is currently moving. If the toolbox is not moving, there is no catch behavior to perform and the process is complete. If the toolbox is moving, the process proceeds to step 804.

At step 804, a virtual camera A is defined with a center of projection P fixed to the current pose of the user's head. This camera faces forward and represents the field of view that is rendered to the user's display.

At step 806, the vertices T of the front face of the 3D bounding box of the toolbox are back-projected to pixels U of the virtual camera A.

At step 808, the minimum axis-aligned 2D box B containing all pixels in U is constructed.

At step 810, the 2D box B is extended by a pre-defined distance N in all directions in the pixel plane of the virtual camera A. This is the "catch" zone.

At step 812, a determination is made regarding whether the 2D box B contains the center pixel of the virtual camera A. If not, the process is complete.

If the 2D box B contains the center pixel of A, then the toolbox motion is stopped at step 814. Further, if the toolbox is currently minimized, then step 814 also includes the triggering of the animation sequence that maximizes the toolbox.

In view of the above, the menu/toolbox follows as the user moves his/her head. In particular the menu/toolbox follows the user's gaze smoothly, and may stay in the upper right-hand corner for continuity of motion. This allows the menu/toolbox to remain in view most of the time for the user, but without keeping the menu totally static. Such a follow and continuity of motion also tends to avoid motion sickness. In addition, as the user moves the gaze cursor towards the menu/toolbox, the menu/toolbox may halt/stop moving. To interact with the main menu, the user can move the gaze cursor over the menu/toolbox. When the cursor is over the menu/toolbox, it opens, and the currently selected icon may be highlighted. Further selection/activation of a highlighted option/icon may be conducted via air-tap where the gaze cursor is located.

Continuity of Motion

The motion of the toolbox during follow and catch behaviors is designed to be smooth and continuous. The smooth animations when the toolbox is summoned, dismissed, minimized, maximized, or switched from horizontal (main menu) to vertical (tool sub-menu) are also smooth and continuous. These movement properties are designed to minimize distraction and disruption to the user's focus.

Obstruction Avoidance and Distance Maintenance

The toolbox user interface is designed to stay between the user and the model at all times. If the toolbox were to move further from the user, it would collide with the model and become difficult to see and to interact with. Embodiments of the invention also attempt to maintain a minimum distance to the user as well as a constant apparent scale that is visible and usable.

Figure 9:
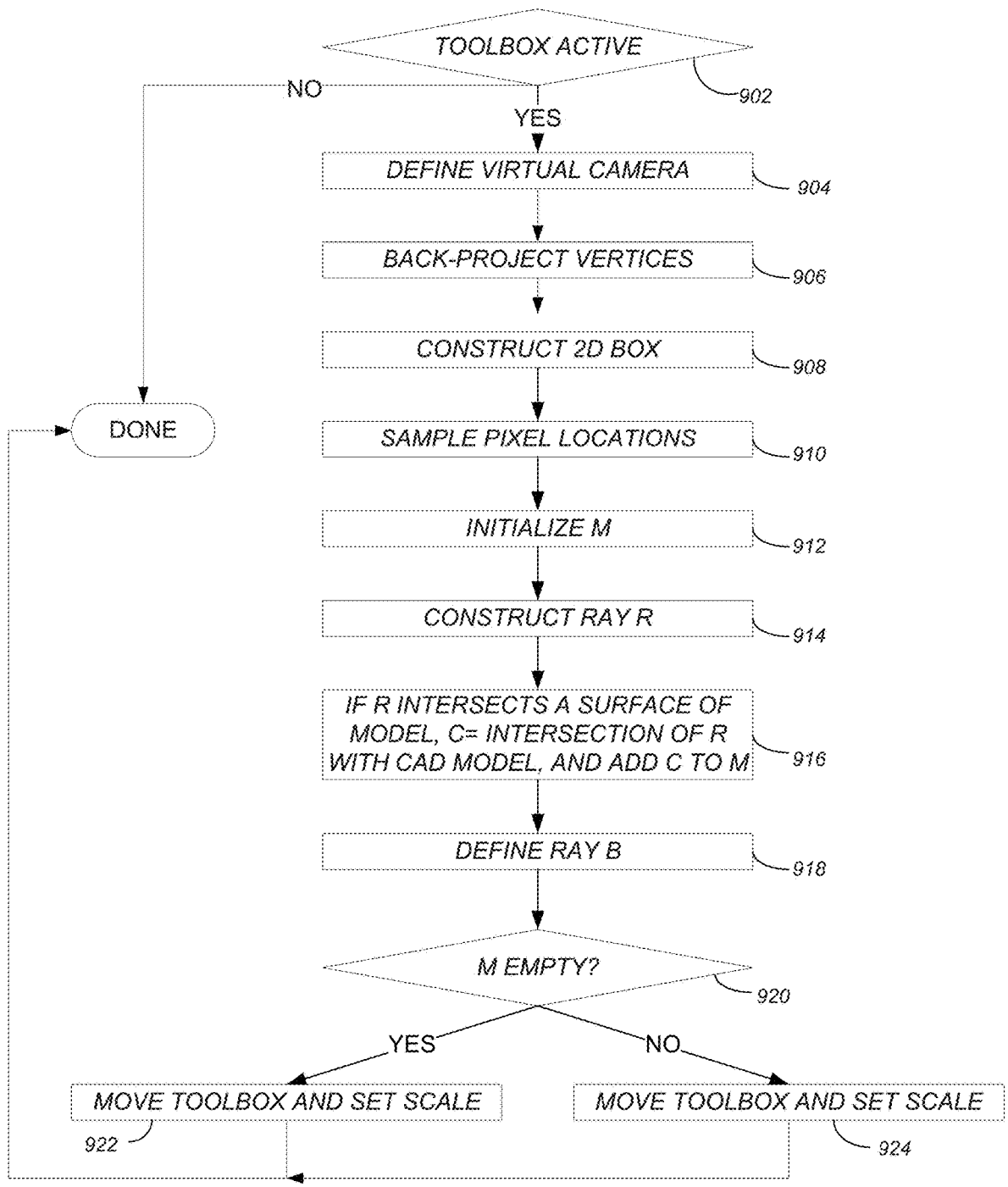
FIG. 9 illustrates the logical flow for avoiding obstructions and maintaining the appropriate distance for toolboxes in accordance with one or more embodiments of the invention.

FIG. 9 illustrates the logical flow for avoiding obstructions and maintaining the appropriate distance for toolboxes in accordance with one or more embodiments of the invention. The steps of FIG. 9 are performed for each rendered frame.

At step 902 a determination is made regarding whether the toolbox is currently active. If the toolbox is not currently active, the process is complete. If active, the process continues with step 904.

At step 904, a virtual camera A is defined with a center of projection P fixed to the current pose of the user's head. This camera faces forward and represents the field of view that is rendered to the user's display.

At step 906, the vertices T of the front face of the 3D bounding box X of the toolbox is back-projected to pixels U of the virtual camera A.

At step 908, the minimum axis-aligned 2D box B containing all pixels in U is constructed.

At step 910, a pre-defined number Ns of pixel locations S equally spaced in B are sampled.

At step 912, M is initialized to the empty set.

Steps 914-916 are performed for each pixel V in pixel locations S. At step 914, the ray R from the center of projection P through each pixel V is constructed. At step 916, if ray R intersects at least one surface of the CAD model, then C is defined as the intersection of ray R with the CAD model nearest the center of projection P, and C is added to the set M.

At step 918, a ray B from the center of projection P through the current location O of the center of X is defined.

A determination is made at step 920 regarding whether M is empty. If M is empty, the process continues to step 922. If M is not empty, processing continues with step 924. Both steps 922 and 924 perform a move of the toolbox and set a scale but in different ways.

In step 922, the toolbox is moved along B to a pre-defined default distance $D_{toolbox}$ from the center of projection P. Further, the scale of the toolbox is set to 1.

In step 924, L is defined as the point in M closest to the center of projection P, and $D_{model}$ is defined as the distance from P to L. If $D_{model} > D_{toolbox}$, then the toolbox is moved along B to distance $D_{toolbox}$ from P, and the scale of the toolbox is set to 1. However, if $D_{model}$ is not greater than $D_{toolbox}$, $D_{offset}$ is defined as a pre-defined offset distance. Thereafter, if $D_{offset} < D_{model}$, then the toolbox is moved along B to distance $D_{adjusted} = D_{model} - D_{offset}$ from P. If $D_{offset}$ is not less than $D_{model}$, the toolbox is moved along B to a distance $D_{adjusted} = D_{model}/2$ from P. The scale of the toolbox (regardless of whether $D_{offset}$ is less than $D_{model}$) is set to $D_{adjusted}/D_{toolbox}$. Table A illustrates the logical flow of step 924 when M is not empty:

TABLE A a. Let L be the point in M closest to P, and let $D_{model}$ be the distance from P to L.
b. If $D_{model} > D_{toolbox}$ then
    i. Move the toolbox along B to distance $D_{toolbox}$ from P.
    ii. Set the scale of the toolbox to 1.
    iii. End.
c. Else let $D_{offset}$ be a pre-defined offset distance.
    i. If $D_{offset} < D_{model}$ then move the toolbox along B to distance $D_{adjusted} = D_{model} - D_{offset}$ from P.

TABLE A-continued ii. Else move the toolbox along B to a distance $D_{adjusted} = D_{model}/2$ from P.
iii. Set the scale of the toolbox to $D_{adjusted}/D_{toolbox}$.

Free vs. Constrained Manipulation

The translate, rotate, and scale tools of embodiments of the invention may be configured with both free and constrained interaction modes. In this regard, free manipulation allows the model to be moved at will by the user, while constrained manipulation is limited to a single axis. Such capabilities allows input to be limited by axes where appropriate and at the user's discretion.

Free translate mode allows the user to move the model by performing an air tap drag gesture. As the user moves their hand forward, back, left and right the model translates similarly. This mode is useful when the user wants to quickly position a model without the need to translate on a specific axis or a specific metric distance. An example use case is a placing the model on the floor in approximately the center of the room.

Constrained translate mode enables the user to manipulate according to specific units of measure and along a specific axis. In this mode an axis triad appears on the surface of the model at the location of the gaze cursor when the user air taps. Three perpendicular lines extend from it in each of the principal axes directions X, Y, and Z. Small spheres are positioned along these lines at predefined divisions (e.g., 2 mm, 1 cm, 10 cm, and 1 m). The smaller divisions are visible when the user gazes at areas of the line that are closer to them and larger ones are displayed as the user gazes at areas further away. Text displaying the selected distance floats above whichever division is gazed upon. When the user air taps while gazing at one of the divisions the model jumps to that position. This mode is useful for cases such as moving the model so that one surface is touching another surface and the user knows that distance beforehand.

In view of the above and in accordance with one or more embodiments, if the user performs a single air-tap and hold, an entire model may be selected. Thereafter, the user can move his/her arm to relocate/translate the model, and release via an air tap. In this regard, the model may be redrawn/relocated/translated to a new location selected by the user.

Free rotate mode allows the user to use hand movement to rotate the model by performing an air tap drag gesture. Once a single air-tap has been performed, the model may be selected and axes are displayed. As the user moves his/her hand forward, back, left and right, the model rotates freely. Accordingly, the free/unconstrained rotate options allow a user to perform quick rotations through multiple axes (e.g., three dimensions) to reach a specific viewpoint.

Constrained rotate mode enables the user to rotate the model to specific angles in the X, Y, or Z axis. In this mode, a different type of axis triad appears when the user air-taps on the model, comprised of three perpendicular rings for X, Y, and Z. When the user tap-drags while gazing on one of the rings (thereby selecting that particular axis) the model rotates around that axis. Further, the single selected axis may remain in color, while the other two axes may be desaturated. Accordingly, using any of the three axes will limit the rotation to a single axis, instead of all three axes simultaneously. Text displaying the amount of rotation floats near the ring. This mode is useful for use cases such as rotating the model to represent a mechanized installation approach in a planned assembly procedure.

Further to the above, the user may also have the option to single air-tap on the menu/toolbox to open the main menu and select a "reset" option that allows the user to reset any rotation that has been performed (thereby restoring the model to its original orientation from the initial loading of the model).

Free scale mode enables the user to scale the model by performing an air-tap drag gesture and moving their hand forward and back. Moving forward increases the scale. Moving backwards decreases the scale. This mode is useful, for example, when the user wants to scale the entire model within the field of view.

Constrained scale mode enables the user to scale incrementally using preset buttons in the tool sub-menu. Optional presets are: ¼, ½, 1, and 2.

Accordingly, the free and constrained scale modes may be enabled by a user moving a gaze cursor to the menu/toolbox, and performing a single air-tap to open the main menu followed by a single air-tap to open the scale tool. Thereafter, the user may have the option to scale a selected object, such as making a selected object bigger to allow the user to see more fine detail, or check potentially tight clearances. Similarly, the user may move his/her hand away from the model to reduce the size of the object and towards the model to increase the size of the object. To reset the object scale, a "reset" tool may be selected via a single-tap in the main menu. Such a selection resets the model's scale back to the scale of the model when the model was originally loaded.

While the above manipulations may be performed on the entire model, embodiments of the invention may also enable such manipulations to be performed on specific object(s)/component(s)/part(s) of the model once the specific object(s)/component(s)/part(s) have been selected as described above.

Fine vs. Gross Manipulation

Users can also toggle the translate, rotate, and scale tools between fine and gross manipulation modes from within their respective sub-menus. By default, the tools are set to gross manipulation. This is useful for larger manipulations like moving a CAD model across the room. Fine mode is useful for sub-centimeter motions. When attempting to align a virtual 3D model with a physical object, such as a partially assembled instrument, fine mode can be very helpful.

Multi-User Collaboration

In addition to the above described features, embodiments of the invention may further enable collaboration amongst multiple users participating in a collaboration session where users can load and render complex CAD models in a collaborative augmented reality environment. Collaboration features include support for the collaboration itself, hand-gestured based interactions and user interfaces, and visual and interaction design elements that minimize distraction. In this regard, embodiments of the invention enable users to easily share designs, discover problems, design integration approaches, and evaluate safety before physical hardware is created.

A user may open a model through a web client and all connecting users (e.g., via web clients and/or via HOLOLENS) load the same model. In this regard, embodiments of the invention provide a native collaborative environment, and allow multiple users to view and interact with the same model in collocated or non-collocated sessions.

Further, as described above, systems of embodiments of the invention provide a graphical toolbox for each user that may be hidden by default. A hand gesture (that is detected by a holographic computer and head-mounted display [such as HOLOLENS]) may be used to summon the toolbox. The toolbox provides a menu of tools the user may employ to interact with the model and with the system, including tools to rotate, translate, and scale the model or individual subassemblies or parts thereof. Any participant in the session may use these tools at any time to adjust the pose of the model relative to the physical environment, and all other participants also see the resulting changes in the model pose.

Protospace™ Visualization System Advantages

Most existing CAD visualization systems use traditional desktop or projection screens for rendering. In contrast, embodiments of the present invention (referred to as the Protospace™ application or Protospace™ processing pipeline) provide an augmented reality type system. Advantages of such a system include the ability to render CAD models at true physical scale. In this regard, traditional visualization systems need to scale many models down to fit within available screen space. Showing large models at their true scale can help users understand spatial relationships among parts of the model, evaluate feasibility of proposed assembly or maintenance procedures, understand reachability of components from the point of view of human technicians, and compare the model to related physical equipment (e.g., tools, fixtures, and assembly support equipment).

Additional advantages include enabling natural navigation of a CAD model so that multiple users may each take their own unique viewpoint by physically moving around in space. Existing systems are most commonly limited to a single viewpoint controlled by one person. In collaboration and group discussion contexts, this can be a challenge as some use-cases call for each participant to prefer a unique viewpoint.

Embodiments of the invention further enable users to walk directly through the model and thus conveniently explore internal details as well as external features of a model. While it is possible to use existing systems to look inside a model, often this is challenging in practice and requires setting up section views, exploded views, or to laboriously hide enclosing geometry.

Further to the above, embodiments of the invention can handle models that are more complex than prior art AR/VR based systems and further offers multiple features for collaborate use, including non-collocated sessions that utilize a unique toolbox and gesture-based model interactions.

Additional advantages include the ability to leverage the system during various phases of a product's development cycle include idea creation/formulation, proposal, design, review, assembly, test, installation, operation, and maintenance. During the idea creation/formulation phase, various product structures can be dynamically mocked up and individual subassemblies can be easily moved. In the proposal phase, embodiments of the invention can be used to present virtual models of a proposed product to potential funders or customers. In the design phase, embodiments can show the current design-in-progress to facilitate discussions about next steps and design tradeoffs among team members. It can also be used to greatly enhance teleconferences with remote participants by placing all participants into a shared virtual space with the model under discussion. In the assembly phase, embodiments can overlay not-yet-built parts of an assembly onto already-built hardware. In the test, installation, operation, and maintenance phases, embodiments can overlay a rendering of internal components to provide a virtual x-ray view into physical assemblies.

Initialization and Processing Pipeline for System

Embodiments of the invention may accept models exported from CAD systems (e.g., in the Jupiter Tessellation [JT] format or STEP format). Further, embodiments may also tightly integrate with CAD systems so that models can be visualized without an explicit export/import procedure. In addition, embodiments of the invention may support multiple types of interaction with model, such as spatially composing multiple models, adding primitive shapes, and adding labels and other forms of annotation.

As part of the processing pipeline, one or more embodiments of the invention imports, processes, and stores data from mechanical CAD systems for optimized use in downstream visualization applications, particularly those developed for web, mobile, and VR/AR (e.g., the Protospace™ application). A pipeline of embodiments of the invention may include a set of command-line software tools.

Pipeline Overview

The pipeline may perform one or more of the following:
- imports and converts CAD data (from formats such as JT and STEP) including animations for use in mobile, web, and AR/VR visualization applications;
- import geometry data in B-REP or triangle mesh format or a mix of the two;
- track persistent identifiers from CAD to support re-importing updates to previously processed models;
- automatically detect and correct violations of two-manifold mesh topology requirements;
- automatically detect and correct unintended non-monolithic subassemblies;
- provide a self-contained scripting language with a command set to support simplification of complex mechanical models;
- remove internal geometry from CAD models while preserving externally visible details; and
- convert mechanical CAD industry formats (e.g. JT) to digital content creation industry format (e.g. FBX).

Such a pipeline addresses various problems of the prior art. For example, embodiments of the pipeline invention: efficiently read, process, and write large mechanical CAD visualization models including up to hundreds of thousands of subassemblies and 100 million polygons; transform mechanical CAD visualization models into a form that is optimized for use in downstream web and mobile visualization applications, including AR/VR applications; convert from multiple industry and vendor-specific data formats for CAD visualization into a single unified format; automatically detect and correct some types of issues which commonly occur in visualization data exported from mechanical CAD systems; extract persistent identifier data from mechanical CAD visualization models; offer a scriptable set of tools for selectively reducing the complexity of CAD visualization models that balances expressiveness and convenience; and automatically generate data structures to augment mechanical CAD visualization models to aid performance of downstream visualization applications.

In particular, the embodiments of the pipeline invention provide a set of command line tools for WINDOWS 10 that enable large and complex CAD visualization models (up to 100 million triangles and 100s of thousands of subassemblies) to be prepared for optimized viewing in downstream visualization applications, with particular optimizations to enable web, mobile, and augmented and virtual reality visualization. These tools were originally developed for use with the Augmented Reality Collaborative Visualization system described herein, but can also be used independently. Embodiments of the processing pipeline invention read industry standard formats including JT (ISO 14306) and STEP (ISO 10303), which can be exported from many mechanical CAD systems, and can write the data in an easy to use and documented format optimized for visualization systems. Support may be included for both boundary representation (BREP) as well as triangle mesh geometry data, product structure metadata, and animations (or a mix of such data). Several categories of common issues with CAD visualization data are automatically detected and corrected. Model-specific scripts can be developed to apply custom processing on a per-model basis, using persistent identifiers where possible to enable the same script to be re-used even after updates to the original CAD model. In addition, the processing pipeline is efficient and can often process models of up to 100 million triangles in less than 10 minutes on a typical workstation (i.e., compared to prior art software that may require many hours to achieve similar processing on a similar type of model).

Processing Pipeline Details

As described above, the pipeline process imports, processes, and stores data from mechanical CAD systems for optimized use in downstream visualization applications, particularly those developed for web, mobile, and virtual or augmented reality. The import, processing, and storage features include:

Reading visualization data exported from CAD systems.

Converting model geometry data and product structure metadata to custom formats optimized for use on mobile and web platforms. If animation data is associated with the model, it is also converted. Geometry data describes the surface shape of each mechanical component as a tessellated mesh of polygons, typically triangles. One or more levels of detail (LOD) may be included with different numbers of triangles. Product structure metadata describes the assembly/subassembly structure of the model and includes human readable names for each component, semantic type tags, parent/child relationships among components, and other metadata imported from CAD as well as metadata added by the processing pipeline.

Associating subassemblies with persistent identifiers which, where possible, do not change across revisions to a particular CAD model. These allow a user to import a revision to a CAD model and automatically re-apply operations which had been developed for prior versions of that model.

Tessellating geometry data which is only available in the input file in boundary representation (B-REP) format. The tessellation process converts B-REP data to corresponding triangle meshes at one or more levels of detail.

Automatically detecting and correcting certain categories of issues that can be present in the imported CAD model data. This may include automatic detection of meshes that do not meet a two-manifold topology requirement and detection of non-monolithic subassemblies (i.e. with children) that are intended to be treated as monolithic (i.e. with no children). In both cases where the issue is detected, it is also corrected: metadata is added to flag meshes which are found to violate the two-manifold requirement so they can be specially handled by downstream visualization applications, and incorrect non-monolithic subassemblies are merged into monolithic ones.

Computing optimized oriented bounding boxes for each subassembly. These are added to the saved metadata and can be used to optimize rendering performance in downstream visualization applications.

Generating optimized approximating meshes for each monolithic subassembly. These approximations are added to the saved geometry data and metadata and can be used to optimize rendering and user interface performance in downstream visualization applications.

Optionally applying a set of model processing operations specified in a custom scripting language. Users of the processing pipeline may choose to associate a script with a particular model to apply custom processing steps which further optimize the saved model for use in downstream visualization applications. The set of available script commands may include the following operations: delete, remove LOD, visibility cull, and box cut. The delete operation removes specific subassemblies identified either by name, name pattern, semantic type tag, persistent identifier, or below a specified physical size. The remove LOD operation removes specific LOD meshes from subassemblies identified in a similar manner. The visibility cull operation removes parts of the geometry which are hidden by other parts from the point of view of any external observer. The box cut operation either keeps or removes geometry within a specified 3D box in the model coordinate frame.

Saving the resulting processed model geometry data and product structure metadata to disk files and reporting statistics of the model to the user. It is also possible to export the model into the AUTODESK FBX format that is commonly used in the digital content creation industry.

In view of the above, the processing pipeline of one or more embodiments of the invention may address one or more of the following problems:

efficiently reading, processing, and writing large mechanical CAD visualization models including up to hundreds of thousands of subassemblies and 100 million polygons transforming mechanical CAD visualization models into a form which is optimized for use in downstream web and mobile visualization applications, including AR/VR applications;

converting from multiple industry and vendor-specific data formats for CAD visualization into a single unified format;

automatically detecting and correcting some types of issues which commonly occur in visualization data exported from mechanical CAD systems;

extracting persistent identifier data from mechanical CAD visualization models;

offering a scriptable set of tools for selectively reducing the complexity of CAD visualization models that balances expressiveness and convenience; and automatically generating data structures to augment mechanical CAD visualization models to aid performance of downstream visualization applications.

Web Portal

Overview

As described above, embodiments of the invention may provide a collaboration system where multiple users can collaborate together on a CAD model. One or more embodiments of the invention provide a web client/portal for use in such a collaboration session.

The Web portal is a web application comprised of a custom secure web server and a tightly coupled multi-user client application that runs in a web browser. It can be deployed as a graphical user interface and multi-user wrapper around the CAD Model Processing Pipeline described above. The web portal and pipeline can be used together as a system to process and optimize CAD models for consumption by various downstream visualization applications, particularly for web, mobile, and virtual/augmented reality.

In particular, the web portal is a multi-user client-server web application which, together with the processing pipeline described above, enables large and complex CAD visualization models (up to 100 million triangles and 100s of thousands of subassemblies) to be prepared for optimized viewing in downstream visualization applications, with particular optimizations to enable web, mobile, and augmented and virtual reality visualization. Whereas the processing pipeline on its own may be structured as a set of single-user command line tools with no graphical interface, the web portal adds both a multi-user secure backend as well as a modern web-based graphical front-end. These capabilities transform the fundamental model processing functions of the pipeline into a web service that can be deployed for secure simultaneous access by multiple users over a network.

The web portal is unique in that it can wrap the processing pipeline to provide both a multi-user front-end user interface as well as secure database back-end. Further, the web portal of embodiments of the invention may be structured as a modern multi-user client-server web application. Further, embodiments of the invention also address the challenge of securely warehousing CAD visualization models and serving them to visualization client applications.

The web portal of embodiments of the invention may address one or more of the following problems:
- providing security and authentication to allow multiple users to upload, process, organize, view, and download CAD models;
- processed versions thereof for use in visualization applications;
- provide a graphical front-end to facilitate writing scripts to process and optimize CAD models for use in mobile, web, and virtual/augmented reality visualization applications;
- give users access to certain statistics of CAD visualization models, such as the total number of triangles, which can be hard to extract from other systems including the originating CAD system.

The web portal may also add one or more of the following advantages compared to existing software:
- it is structured as a multi-user client-server web application. Thus, multiple users may access it simultaneously. Unlike traditional desktop applications, the web portal client application requires no installation steps and is compatible with a wider set of client computer hardware and operating systems.
- its user interactions and graphical user interfaces are designed to maximize familiarity to mechanical engineers and users of CAD systems. For example, the hierarchy tree, 3D view, and history-based script operation interface all are modeled after corresponding elements familiar in CAD systems. Thus, the web portal can be easy to learn and use by a population of mechanical engineering and CAD users. Existing competing applications may make more assumptions that users are experts in visualization systems, graphics, or 3D art.
- it provides secure warehousing of CAD visualization data and can securely serve that data to client visualization systems. Existing products on the market for preparing CAD visualization models are structured as traditional desktop applications, not as client-server systems, and so do not offer these features.

Web Portal Details

The processing pipeline described above can be used on its own without the web portal. However, the processing pipeline tools are designed for a single user and are command-line driven with no graphical interface. The web portal adds both a user-interface front-end and a secure database back-end to the processing pipeline which:

Implements secure authenticated multi-user log in. Users connect to the web portal over a network using a standard web browser. Up to a defined number of users may simultaneously log in and concurrently use the system. Various deployment and authentication configurations are possible. For example, the web portal may be deployed on an institution-wide basis within an institutional intra-net and integrated with an institutional user authentication database such as LDAP (lightweight directory access protocol). In such a deployment the web portal would only be accessible from within the institutional intra-net and would also require users to supply their institutional username and password to gain access. Other deployment configurations can include multiple isolated deployments of the web portal within an institution, institution-private deployment on AMAZON GOVCLOUD or other cloud services, or access to a cloud deployment which is shared across institutions.

Provides secure upload and download of CAD visualization models. Once logged in, users may upload one or more CAD visualization models in any format supported by the processing pipeline. The web portal provides secure encrypted transfer from the user's client machine to the web portal server. Users may later download processed versions of the models with a secure transfer from server to client also provided by the web portal. All encryption uses proven standard protocols and methods such as HTTPS and SSL.

Warehouses, organizes, and provides access control for uploaded CAD models. The web portal provides persistent server storage for all models that have been uploaded to it or processed on it. The web portal may be configured such that a set of named projects are defined. Each user may be given access to one or more project. Each model is also assigned to one or more projects. The web portal ensures that users may only access models within the projects to which they have been assigned. The web portal also provides a system and user interface for organizing the list of models available within each project including functions to rename and delete models. Deletion is implemented with a trash system so that accidentally deleted models may be recovered.

Displays model statistics to give feedback to users about the complexity of each uploaded model. Feedback on certain metrics including the total number of triangles in the mesh geometry of a model can enable users to make decisions about compatibility of complex models with certain visualization systems. This is particularly important for web, mobile, and virtual/augmented reality visualization tools. Often, such metrics are unavailable or difficult to access from within the originating CAD systems.

Provides a graphical user interface and interactive 3D view to develop scripts for the processing pipeline. The scripting functionality of the processing pipeline allows users to customize processing for individual models and to create multiple different processed versions of a model if desired. Script commands are available to trim model complexity in various ways, for example, by removing components identified by name, type, size, or spatial location within the model. It is possible to write such scripts using only a text editor but in practice a graphical view of the model can make that task far easier. For example, the user can click on components in a 3D view of the model to conveniently retrieve their name, type, or persistent identifier. Users may also preview and adjust the boundary of volumes defined for including or excluding geometry. These and other features are implemented by the web portal in a unified graphical user interface within the web browser. This interface provides a tree view of the CAD model product structure hierarchy, an interactive 3D view of the model geometry, a history-based editable list of script operations defined by the user, and various live displays that report critical metrics of the model including the predicted total number of triangles after applying the script operations. It serves as a complete solution for effectively writing and editing processing pipeline scripts while entirely abstracting the text of the script from the end-user. The interface provides responsive preview as the user develops a list of script commands. For example, when a box cut command is added, the interface computes a preview of the geometry that will be cut by the 3D box the user has defined for the operation and updates the total count of remaining triangles in the model. Currently this interface can be used for models with up to approximately 30 million triangles. When a user closes the interface, the script is sent back to the server where the web portal automatically runs the processing pipeline on the source model to produce a derived model according to the script commands. The web portal warehouses the script and derived model and also provides user interfaces to allow users to organize and edit the script and derived model, subject to the same authentication and security as above.

Securely serves model data to downstream visualization applications. Such visualization systems may use the documented interfaces of the web portal to warehouse and securely transfer the model data.

Hardware Environment

Figure 10:
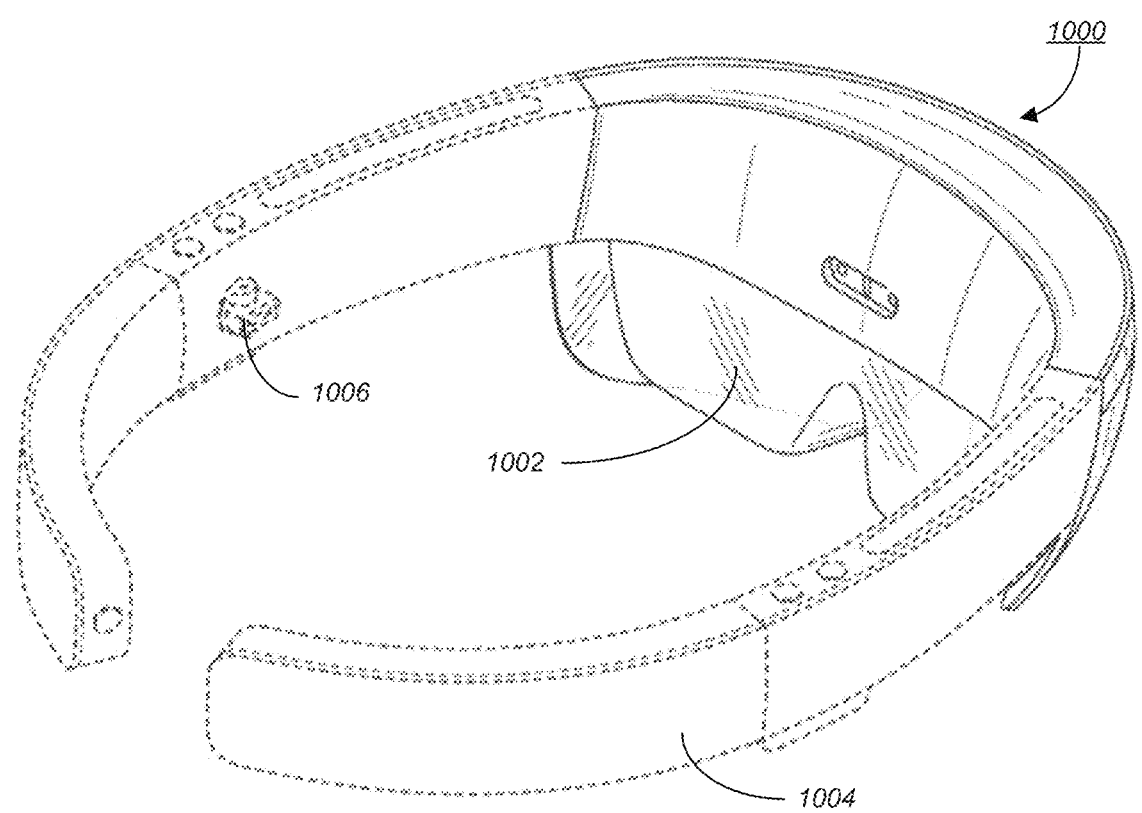
FIG. 10 is an exemplary holographic computing platform used in accordance with one or more embodiments of the invention.

FIG. 10 is an exemplary holographic computing platform used in accordance with one or more embodiments of the invention. As illustrated, the platform may consist of mixed reality smartglasses 1000 (e.g., HOLOLENS). Such mixed reality smartglasses 1000 may consist of a head-mounted display unit 1002 connected to an adjustable headband 1004 that can tilt the display 1002 up and down, as well as forward and backward. To wear the unit 1000, the user fits the device 1000 on their head with the display unit 1002 covering their eyes. Along bottom edges of the side, located near the user's ears, may be a pair of small speakers 1006.

The smartglasses 1000 may include an inertial measurement unit (e.g., that includes an accelerometer, gyroscope, and/or a magnetometer), sensors, a camera, and other components to enable an AR/VR view of models projected/rendered on the display 1002. Further, smartglasses 1000 may also include a central processing unit (CPU), graphics processing unit (GPU), and other processors that enable both the processing and display of models. Further, similar to a desktop/laptop computer, smartglasses 1000 may include peripheral input/output devices to enable communication with other smartglasses 1000 and/or a network interface.

Figure 11:
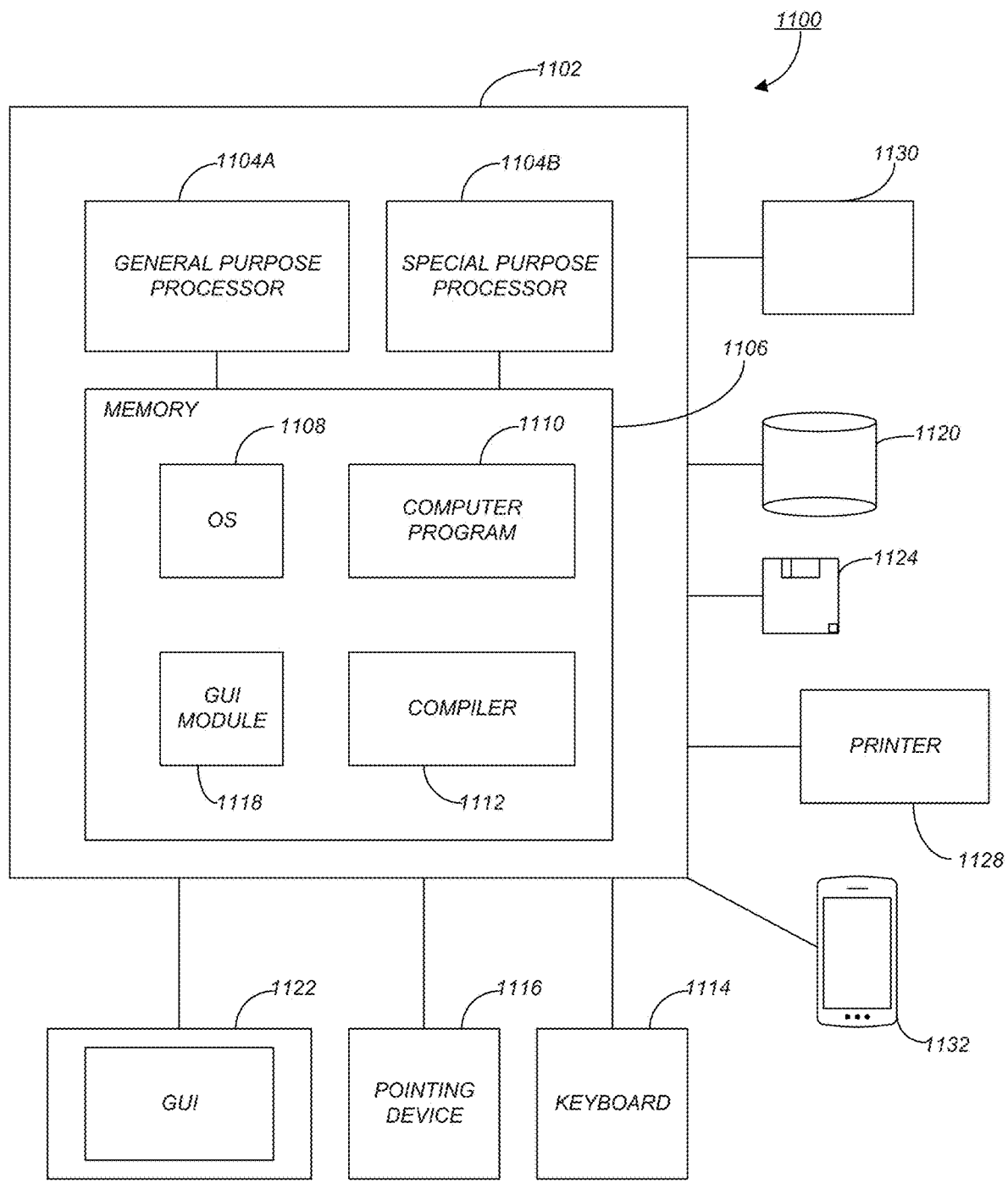
FIG. 11 illustrates an exemplary hardware and software environment used to implement one or more embodiments of the invention.

FIG. 11 illustrates an exemplary hardware and software environment 1100 used to implement one or more embodiments of the invention. As used herein, the hardware and software described in FIG. 11 may be incorporated into and/or utilized by smartglasses 1000 of FIG. 10. The hardware and software environment includes a computer 1102 and may include peripherals. Computer 1102 may be smartglasses, a user/client computer, server computer, or may be a database computer. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a gaze cursor, mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, IPOD, NOOK, portable digital video player, cellular device, personal digital assistant, etc.). In yet another embodiment, the computer 1102 may comprise smartglasses, a holographic computing device, a multi-touch device, mobile phone, gaming system, internet enabled television, television set top box, or other internet enabled device executing on various platforms and operating systems.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a holographic display and/or a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises an AR/VR viewing device. Further, sensors on such a device may enable the recognition of hand gestures performed within the range of the device (e.g., an air-tap, double-tap, a pinch, etc.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
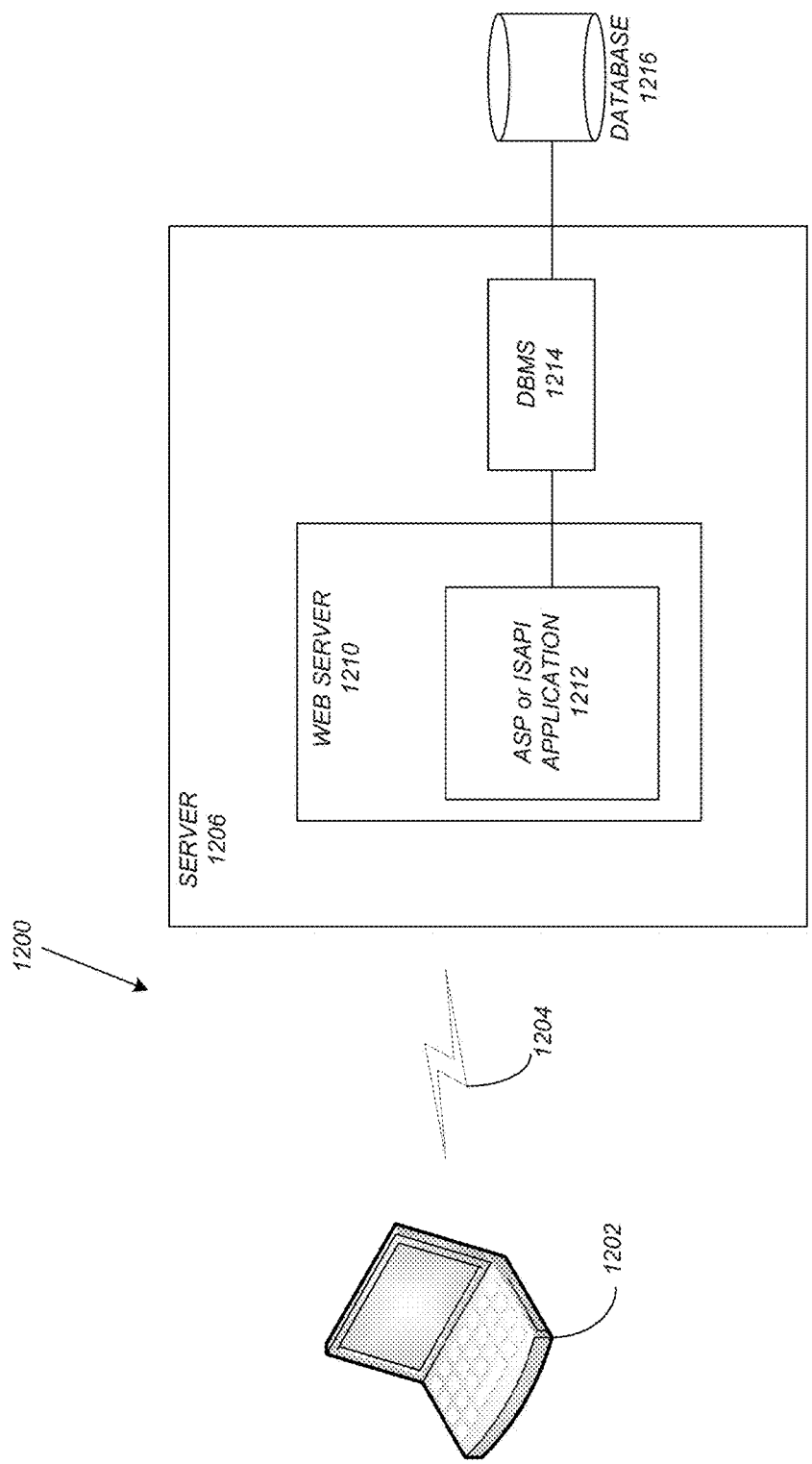
FIG. 12 schematically illustrates a typical distributed/cloud-based computer system using a network to connect client computers to server computers or other client computers participating in a collaboration session in accordance with one or more embodiments of the invention.

FIG. 12 schematically illustrates a typical distributed/cloud-based computer system 1200 using a network 1204 to connect client computers 1202 to server computers 1206 or other client computers 1202 participating in a collaboration session. A typical combination of resources may include a network 1204 comprising the Internet, LANs (local area networks), WANs (wide area networks), SNA (systems network architecture) networks, or the like, clients 1202 that are wearable computers such as that of device 1000 of FIG. 10, personal computers or workstations (as set forth in FIG. 11), and servers 1206 that are personal computers, workstations, minicomputers, or mainframes (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER, MOZILLA FIREFOX, OPERA, APPLE SAFARI, GOOGLE CHROME, etc. In addition, the web portal described above may be executing by/within such a web browser. Further, the software executing on clients 1202 may be downloaded from server computer 1206 to client computers 1202 and installed as a plug-in or ACTIVEX control of a web browser. Accordingly, clients 1202 may utilize ACTIVEX components/component object model (COM) or distributed COM (DCOM) components to provide a user interface on a display of client 1202. The web server 1210 is typically a program such as MICROSOFT'S INTERNET INFORMATION SERVER.

Web server 1210 may host an Active Server Page (ASP) or Internet Server Application Programming Interface (ISAPI) application 1212, which may be executing scripts. The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204. When a developer encapsulates the business functionality into objects, the system may be referred to as a component object model (COM) system. Accordingly, the scripts executing on web server 1210 (and/or application 1212) invoke COM objects that implement the business logic. Further, server 1206 may utilize MICROSOFT'S TRANSACTION SERVER (MTS) to access required data stored in database 1216 via an interface such as ADO (Active Data Objects), OLE DB (Object Linking and Embedding DataBase), or ODBC (Open DataBase Connectivity).

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as head-mounted wearable computers, cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206.

Figure 13:
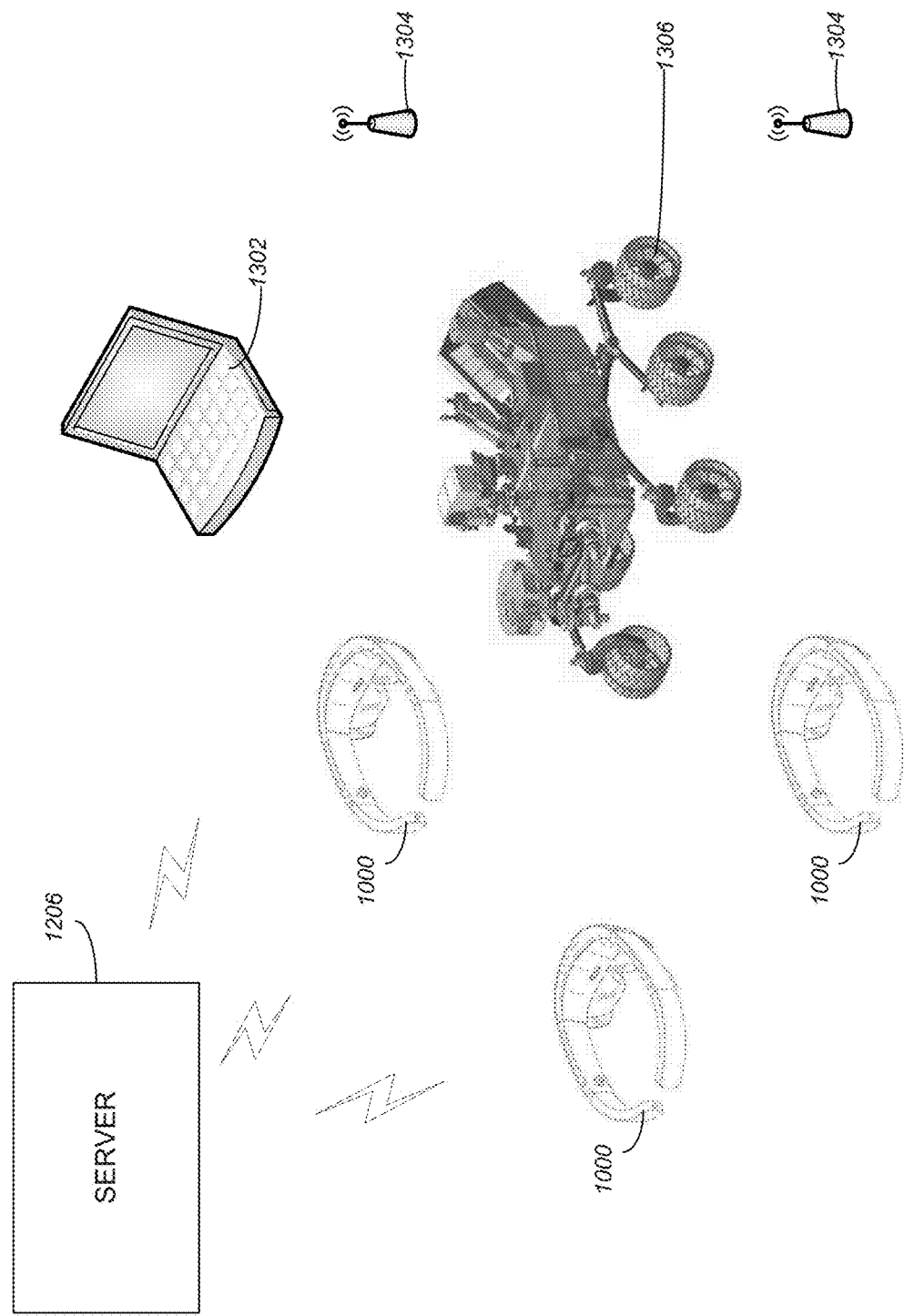
FIG. 13 illustrates a typical configuration of the hardware and sensing components used to render a CAD model in a collaboration session in accordance with one or more embodiments of the invention.

FIG. 13 illustrates a typical configuration of the hardware and sensing components used to render a CAD model in a collaboration session in accordance with one or more embodiments of the invention. As illustrated, multiple head-mounted wearable devices 1000 as well as computer 1302 may be simultaneously viewing a CAD model 1306 that is rendered at true scale in virtual reality space. The ability to coordinate the different wearable devices 1000 and their respective views may be enabled via a set of network servers 1206 that facilitate communication (e.g., via wireless or wired means) and data storage and a web-based interface to client computer 1302. The CAD model 1306 is rendered using AR technology so that it appears as if it were present in the room. Multiple sensors 1304 in the physical space may enable the model 1306 to appear at the same position and orientation in the room for all users 1000/1302, who may walk around the model 1306, point to parts of it, etc. In this regard, sensors 1304 may be used to triangulate the position of devices 1000 in the physical space with respect to each other and the projected location of the model 1306.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for controlling navigation of a three-dimensional (3D) computer aided design (CAD) model in an augmented reality space comprising:
   (a) rendering the 3D CAD model in the augmented reality space, wherein the 3D CAD model appears as if the 3D CAD model is present in a physical space at true scale; and
   (b) for each rendered frame of the rendering:
      (1) defining a virtual camera fixed to a current pose of a user's head;
      (2) constructing a virtual line segment S coincident with a ray R from a center of projection P of the virtual camera and a center pixel of the virtual camera wherein the virtual line segment S starts at a pre-defined minimum distance from the projection P and ends at a pre-defined maximum distance from the projection P;
      (3) checking for geometric intersections between the virtual line segment S and surfaces of scene elements, wherein the scene elements comprise one or more parts of the 3D CAD model and user interface objects;
      (4) determining that there is a geometric intersection with one or more parts of the 3D CAD model; and
      (5) rendering a gaze cursor at an intersection point C closest to the center of projection P, wherein the gaze cursor comprises a visually distinguishable indicator.

2. The method of claim 1, wherein the virtual camera faces forward and represents a field of view that is rendered to a user's display.

3. The method of claim 1, wherein the visually distinguishable indicator comprises a colored sphere.

4. The method of claim 1, wherein the visually distinguishable indicator comprises a point light that creates a surface glow effect.

5. The method of claim 1, further comprising:
receiving an air tap gesture; and
sending a point of interest placed network message to all participants of a session, wherein during the session, all participants are enabled to collaboratively visualize and manipulate the 3D CAD model in the augmented reality space.

6. The method of claim 5, further comprising:
receiving the point of interest placed network message, wherein the point of interest placed network message comprises a part K, an intersection point C that is closest to the center of projection P, and a surface normal N;
highlighting the part K; and
rendering a point of interest marker at intersection point C oriented along the surface normal N.

7. The method of claim 6, further comprising:
receiving a point of interest hidden network message;
removing the highlighting of part K; and
hiding the point of interest marker.

8. The method of claim 1, further comprising:
for each rendered frame of the rendering:
   checking for additional geometric intersections between the virtual line segment S and surfaces of scene elements;
   determining that no geometric intersections are found; and
   rendering the gaze cursor on ray R at a predefined distance D from the center of projection P.

9. The method of claim 1, further comprising:
determining the intersection point C closest to the center of projection P;
classifying a type of object that intersection point C lies on as the part of the CAD model.

10. The method of claim 1, further comprising:
determining the intersection point C closest to the center of projection P;
classifying a type of object that intersection point C lies on as a user interface object O; and
sending a gazed-at message to the user interface object O.

11. A system for controlling navigation of a three-dimensional (3D) computer aided design (CAD) model in an augmented reality space:
   (a) a holographic computing platform comprising a processor and memory;
   (b) a 3D CAD model rendered in the augmented reality space by the holographic computing platform, wherein the 3D CAD model appears as if the 3D CAD model is present in a physical space at true scale, wherein for each rendered frame of the rendering, the holographic computing platform:
- (1) defines a virtual camera fixed to a current pose of a user's head;
- (2) constructs a virtual line segment S coincident with a ray R from a center of projection P of the virtual camera and a center pixel of the virtual camera;
- (3) checks for geometric intersections between the virtual line segment S and surfaces of scene elements, wherein the scene elements comprise one or more parts of the 3D CAD model and user interface objects, wherein the virtual line segment S starts at a pre-defined minimum distance from the projection P and ends at a pre-defined maximum distance from the projection P;
- (4) determines that there is a geometric intersection with one or more parts of the 3D CAD model; and
- (5) renders a gaze cursor at an intersection point C closest to the center of projection P, wherein the gaze cursor comprises a visually distinguishable indicator.

12. The system of claim 11, wherein the virtual camera faces forward and represents a field of view that is rendered to a user's display.

13. The system of claim 11, wherein the visually distinguishable indicator comprises a colored sphere.

14. The system of claim 11, wherein the visually distinguishable indicator comprises a point light that creates a surface glow effect.

15. The system of claim 11, wherein the holographic computing platform further:
receives an air tap gesture; and
sends a point of interest placed network message to all participants of a session, wherein during the session, all participants are enabled to collaboratively visualize and manipulate the 3D CAD model in the augmented reality space.

16. The system of claim 15, wherein the holographic computing platform further:
receives the point of interest placed network message, wherein the point of interest placed network message comprises a part K, an intersection point C that is closest to the center of projection P, and a surface normal N;
highlights the part K; and
renders a point of interest marker at intersection point C oriented along the surface normal N.

17. The system of claim 16, wherein the holographic computing platform further:
receives a point of interest hidden network message;
removes the highlighting of part K; and
hides the point of interest marker.

18. The system of claim 11, wherein the holographic computing platform further:
for each rendered frame of the rendering:
checks for additional geometric intersections between the virtual line segment S and surfaces of scene elements;
determines that no geometric intersections are found; and
renders the gaze cursor on ray R at a predefined distance D from the center of projection P.

19. The system of claim 11, wherein the holographic computing platform further:
determines the intersection point C closest to the center of projection P;
classifies a type of object that intersection point C lies on as the part of the CAD model.

20. The system of claim 11, wherein the holographic computing platform further:
determines the intersection point C closest to the center of projection P;
classifies a type of object that intersection point C lies on as a user interface object O; and
sends a gazed-at message to the user interface object O.

21. A method for controlling navigation of a three-dimensional (3D) computer aided design (CAD) model in an augmented reality space comprising:
- (a) rendering the 3D CAD model in the augmented reality space, wherein the 3D CAD model appears as if the 3D CAD model is present in a physical space at true scale;
- (b) for each rendered frame of the rendering:
  - (1) defining a virtual camera fixed to a current pose of a user's head;
  - (2) constructing a virtual line segment S coincident with a ray R from a center of projection P of the virtual camera and a center pixel of the virtual camera;
  - (3) checking for geometric intersections between the virtual line segment S and surfaces of scene elements, wherein the scene elements comprise one or more parts of the 3D CAD model and user interface objects;
  - (4) determining that there is a geometric intersection with one or more parts of the 3D CAD model; and
  - (5) rendering a gaze cursor at an intersection point C closest to the center of projection P, wherein the gaze cursor comprises a visually distinguishable indicator;
- (c) receiving an air tap gesture; and
- (d) sending a point of interest placed network message to all participants of a session, wherein during the session, all participants are enabled to collaboratively visualize and manipulate the 3D CAD model in the augmented reality space.

22. A system for controlling navigation of a three-dimensional (3D) computer aided design (CAD) model in an augmented reality space:
- (a) a holographic computing platform comprising a processor and memory;
- (b) a 3D CAD model rendered in the augmented reality space by the holographic computing platform, wherein the 3D CAD model appears as if the 3D CAD model is present in a physical space at true scale, wherein for each rendered frame of the rendering, the holographic computing platform:
  - (1) defines a virtual camera fixed to a current pose of a user's head;
  - (2) constructs a virtual line segment S coincident with a ray R from a center of projection P of the virtual camera and a center pixel of the virtual camera;
  - (3) checks for geometric intersections between the virtual line segment S and surfaces of scene elements, wherein the scene elements comprise one or more parts of the 3D CAD model and user interface objects;
  - (4) determines that there is a geometric intersection with one or more parts of the 3D CAD model; and
  - (5) renders a gaze cursor at an intersection point C closest to the center of projection P, wherein the gaze cursor comprises a visually distinguishable indicator; and (c) the holographic computing platform further:
  (1) receives an air tap gesture; and
  (2) sends a point of interest placed network message to all participants of a session, wherein during the session, all participants are enabled to collaboratively visualize and manipulate the 3D CAD model in the augmented reality space.

* * * * *